US011528696B2

(12) United States Patent
Takeda et al.

(10) Patent No.: US 11,528,696 B2
(45) Date of Patent: Dec. 13, 2022

(54) USER TERMINAL AND RADIO COMMUNICATION METHOD

(71) Applicant: NTT DOCOMO, INC., Tokyo (JP)

(72) Inventors: Kazuki Takeda, Tokyo (JP); Yuki Matsumura, Tokyo (JP); Satoshi Nagata, Tokyo (JP); Lihui Wang, Beijing (CN); Xiaolin Hou, Beijing (CN)

(73) Assignee: NTT DOCOMO, INC., Tokyo (JP)

( * ) Notice: Subject to any disclaimer, the term of this patent is extended or adjusted under 35 U.S.C. 154(b) by 100 days.

(21) Appl. No.: 16/962,965

(22) PCT Filed: Jan. 19, 2018

(86) PCT No.: PCT/JP2018/001647
§ 371 (c)(1),
(2) Date: Jul. 17, 2020

(87) PCT Pub. No.: WO2019/142330
PCT Pub. Date: Jul. 25, 2019

(65) Prior Publication Data
US 2020/0344737 A1 Oct. 29, 2020

(51) Int. Cl.
*H04W 72/04* (2009.01)
*H04L 1/18* (2006.01)
*H04W 28/04* (2009.01)

(52) U.S. Cl.
CPC ......... *H04W 72/042* (2013.01); *H04L 1/1812* (2013.01); *H04W 28/04* (2013.01)

(58) Field of Classification Search
CPC ... H04L 1/1812; H04L 1/1825; H04L 1/1861; H04W 28/04; H04W 72/042
See application file for complete search history.

(56) References Cited

U.S. PATENT DOCUMENTS 10,225,050 B2 * 3/2019 Guan ..................... H04L 5/0055
10,404,438 B2 * 9/2019 Park ..................... H04B 7/0413
(Continued)

FOREIGN PATENT DOCUMENTS

AU 2019273246 A1 * 11/2020 ........ H04W 72/1273
CN 106105078 B * 6/2019 ........... H04L 1/0073
(Continued)

OTHER PUBLICATIONS

3GPP TSG RAN WG1 Meeting 91; R1-1721360 "Summary of RAN1#91 Tdocs on PUCCH resource allocation" OPPO; Reno, USA; Nov. 27-Dec. 1, 2017 (14 pages).
(Continued)

*Primary Examiner* — Eric Nowlin
(74) *Attorney, Agent, or Firm* — Osha Bergman Watanabe & Burton LLP

(57) ABSTRACT

A terminal is disclosed including a receiver that receives a downlink shared channel scheduled by downlink control information; and a processor that, when the terminal is configured with a semi-statically determined first codebook and only one downlink shared channel reception is scheduled in a primary cell, controls transmission of a transmission acknowledgement signal in response to the only one downlink shared channel reception, wherein the transmission acknowledgement signal is determined from a second codebook that is different from the first codebook and corresponds only to the only one downlink shared channel. In other aspects, a radio communication method for a terminal and a base station in communication with a terminal are also disclosed.

5 Claims, 11 Drawing Sheets

(56) References Cited

U.S. PATENT DOCUMENTS

| | | | | |
|---|---|---|---|---|
| 10,855,403 | B2* | 12/2020 | Medles | H04L 1/1812 |
| 11,303,419 | B2* | 4/2022 | Yang | H04L 1/1861 |
| 2013/0242816 | A1* | 9/2013 | He | H04W 52/243 |
| | | | | 370/280 |
| 2017/0134140 | A1* | 5/2017 | Park | H04L 1/1887 |
| 2017/0331596 | A1* | 11/2017 | Guan | H04L 1/18 |
| 2019/0132093 | A1 | 5/2019 | Aiba et al. | |
| 2019/0150181 | A1* | 5/2019 | Kim | H04L 1/1858 |
| | | | | 370/329 |
| 2019/0253196 | A1* | 8/2019 | Medles | H04L 1/1854 |
| 2019/0312713 | A1* | 10/2019 | Yang | H04W 72/042 |
| 2019/0363840 | A1* | 11/2019 | Wang | H04L 1/1822 |
| 2021/0006378 | A1* | 1/2021 | Lei | H04L 1/1607 |
| 2021/0266943 | A1* | 8/2021 | Khoshnevisan | H04L 1/1896 |

FOREIGN PATENT DOCUMENTS

| | | | | | |
|---|---|---|---|---|---|
| CN | 110213026 | A | * | 9/2019 | H04L 1/0073 |
| CN | 110247747 | A | * | 9/2019 | H04L 1/0073 |
| CN | 110351022 | A | * | 10/2019 | |
| CN | 110519027 | A | * | 11/2019 | H04L 25/03 |
| CN | 110830174 | A | * | 2/2020 | H04L 1/1861 |
| CN | 111294186 | A | * | 6/2020 | |
| CN | 111788787 | A | * | 10/2020 | H04L 1/1607 |
| CN | 111919407 | A | * | 11/2020 | H04B 7/0417 |
| CN | 110519027 | B | * | 12/2020 | H04B 7/0456 |
| CN | 110247747 | B | * | 1/2021 | H04L 1/0073 |
| CN | 112737738 | A | * | 4/2021 | H04L 5/0078 |
| EP | 2863686 | A2 | * | 4/2015 | G06F 11/08 |
| EP | 3242434 | A1 | * | 11/2017 | H04L 1/0073 |
| EP | 3518600 | A1 | * | 7/2019 | H04W 72/1289 |
| EP | 3518600 | A4 | * | 5/2020 | H04L 5/00 |
| EP | 3753153 | A1 | * | 12/2020 | H04L 5/0055 |
| EP | 3754877 | A1 | * | 12/2020 | G06F 11/08 |
| EP | 3776967 | A1 | * | 2/2021 | H04B 7/0417 |
| EP | 3242434 | B1 | * | 8/2021 | H04L 1/0073 |
| KR | 20170053470 | A | * | 5/2017 | H04L 1/0073 |
| WO | WO-2016119221 | A1 | * | 8/2016 | H04L 1/0073 |
| WO | WO-2017078454 | A1 | * | 5/2017 | H04B 7/0413 |
| WO | 2017/187810 | A1 | | 11/2017 | |
| WO | WO-2018128474 | A1 | * | 7/2018 | H04L 1/1861 |
| WO | WO-2019157658 | A1 | * | 8/2019 | H04L 1/1607 |
| WO | WO-2019195715 | A1 | * | 10/2019 | H04B 7/0417 |
| WO | WO-2019223615 | A1 | * | 11/2019 | H04W 72/1284 |
| WO | WO-2020254274 | A1 | * | 12/2020 | H04L 1/1854 |
| WO | WO-2021167839 | A1 | * | 8/2021 | H04L 5/0094 |
| WO | WO-2021227981 | A1 | * | 11/2021 | |

OTHER PUBLICATIONS

Office Action issued in Chilean Application No. 202001885; dated Oct. 12, 2021 (17 pages).

3GPP TS 36.300 V8.12.0 "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 8)" Mar. 2010 (149 pages).

3GPP TSG RAN WG1 Meeting AH 1801; R1-1800676 "DL/UL scheduling and HARQ management" Vancouver, Canada; Jan. 22-26, 2018 (6 pages).

International Search Report issued in International Application No. PCT/JP2018/001647, dated Apr. 10, 2018 (3 pages).

Written Opinion issued in International Application No. PCT/JP2018/001647; dated Apr. 10, 2018 (3 pages).

Extended European Search Report issued in counterpart European Patent Application No. 18900629.9 dated Jul. 21, 2021 (6 pages).

NTT Docomo, Inc.; "Remaining issues on other aspect of carrier aggregation"; 3GPP TSG RAN WG1 Meeting 91, R1-1720826; Reno, USA, Nov. 27-Dec. 1, 2017 (9 pages).

NTT Docomo, Inc.; "Resource allocation for PUCCH"; 3GPP TSG RAN WG1 Meeting AH 1801, R1-1800674; Vancouver, Canada, Jan. 22-26, 2018 (7 pages).

Office Action issued in the counterpart Japanese Patent Application No. 2019-565663, dated Feb. 15, 2022 (6 pages).

Office Action issued in the counterpart Japanese Patent Application No. 2019-565663, dated Apr. 26, 2022 (6 pages).

Office Action issued in the counterpart Indian Patent Application No. 202037034015 dated Jun. 3, 2022 (5 pages).

* cited by examiner

USER TERMINAL AND RADIO COMMUNICATION METHOD

TECHNICAL FIELD

The present invention relates to a user terminal and a radio communication method in next-generation mobile communication systems.

BACKGROUND ART

In the UMTS (Universal Mobile Telecommunications System) network, the specifications of Long Term Evolution (LTE) have been drafted for the purpose of further increasing high speed data rates, providing lower latency, and so on (see Non-Patent Literature 1). In addition, successor systems of LTE are also under study for the purpose of achieving further broadbandization and increased speed beyond LTE (referred to as, for example, "LTE-A (LTE-Advanced)," "FRA (Future Radio Access)," "4G," "5G," "5G+(plus)," "NR (New RAT)," "LTE Rel. 14," "LTE Rel. 15 (or later versions)," and so on).

In existing LTE systems (for example, LTE Rel. 8 to Rel. 13), downlink (DL) and/or uplink (UL) communications are carried out, using a subframe (also referred to as "transmission time interval (TTI)" and so on) of 1 ms. This subframe is a unit of time to transmit one data packet that is channel-coded, and is a processing unit in scheduling, link adaptation, retransmission control (HARQ (Hybrid Automatic Repeat reQuest)), and so on.

In existing LTE systems (for example, LTE Rel. 8 to Rel. 13), a user terminal transmits uplink control information (UCI) on an uplink control channel (for example, PUCCH: Physical Uplink Control Channel) or an uplink data channel (for example, PUSCH: Physical Uplink Shared Channel). A configuration (format) of the uplink control channel is referred to as a PUCCH format (PF) and so on.

CITATION LIST

Non-Patent Literature

Non-Patent Literature 1: 3GPP TS 36.300 V8.12.0 "Evolved Universal Terrestrial Radio Access (E-UTRA) and Evolved Universal Terrestrial Radio Access Network (E-UTRAN); Overall description; Stage 2 (Release 8)," April, 2010

SUMMARY OF INVENTION

Technical Problem

For future radio communication systems (also described simply as "NR" below), a study is underway that a user terminal semi-statically or dynamically determines the size of a transmission acknowledgement signal (also referred to as an "HARQ-ACK," an "ACK/NACK," or an "A/N") to control feedback of the transmission acknowledgement signal. The size of an HARQ-ACK is also referred to as "codebook," "codebook size," or "bit string size."

When a mode of semi-statically determining HARQ-ACK codebook is configured, a UE fixedly determines HARQ-ACK bits to transmit as feedback, based on information reported through higher layer signaling. For example, the UE performs transmission by using codebook corresponding to an HARQ-ACK for each of all DL transmissions (for example, a PDSCH) having a possibility of being scheduled within a certain range. In this case, the UE transmits a NACK as feedback for any PDSCH not scheduled within the certain range.

In this way, in a case of determining HARQ-ACK codebook irrespective of the number of DL transmissions to be scheduled, a number of HARQ-ACK bits need to be constantly transmitted even when the number of DL transmissions to be actually scheduled is small (for example, one or two). Consequently, the UE needs to generate a number of HARQ-ACKs irrespective of the number of DL transmissions to be scheduled, which may increase the processing load of the UE and may decrease the throughput and/or deteriorate the communication quality.

An object of the present disclosure is to provide a user terminal and a radio communication method which can prevent an increase in processing load of a UE even when HARQ-ACK codebook is semi-statically configured.

Solution to Problem

An aspect of a user terminal of the present invention includes: a transmitting section that transmits a transmission acknowledgement signal for a downlink transmission; and a control section that controls, when a mode of determining codebook of the transmission acknowledgement signal, based on information reported through higher layer signaling is configured, transmission of the transmission acknowledgement signal by using one of a first PUCCH resource set configured for the transmission acknowledgement signal to be transmitted based on the codebook and a second PUCCH resource set configured for the transmission acknowledgement signal of number of bits up to a certain value, based on number of bits of the transmission acknowledgement signal, or the number of bits of the transmission acknowledgement signal and a type of cell in which the downlink transmission is to be performed.

Advantageous Effects of Invention

According to an aspect of the present disclosure, an increase in processing load of a UE can be prevented even when HARQ-ACK codebook is semi-statically configured.

DESCRIPTION OF EMBODIMENTS

For NR, a study is underway that a user terminal semi-statically or dynamically determines an HARQ-ACK size (HARQ-ACK codebook) to perform an HARQ-ACK transmission using a PUCCH. For example, a base station reports a method of determining HARQ-ACK codebook to a UE through higher layer signaling.

When a mode of semi-statically determining HARQ-ACK codebook is configured, the UE determines the number of HARQ-ACK bits or the like, based on a configuration configured through higher layer signaling. The configuration configured through higher layer signaling (higher-layer configuration) may be, for example, the maximum number of DL transmissions (for example, PDSCHs) to be scheduled over a range associated with HARQ-ACK feedback timings.

The range associated with HARQ-ACK feedback timings corresponds to at least one (for example, all) of space, time, and frequency (freq). The range associated with HARQ-ACK feedback timings is also referred to as an "HARQ-ACK bundling window," an "HARQ-ACK feedback window," a "bundling window," or a "feedback window."

In contrast, when a mode of dynamically determining HARQ-ACK codebook is configured, the UE determines the number of HARQ-ACK bits and so on, based on bits indicated in a DL assignment index (DAI: Downlink Assignment Indicator (Index)) field included in downlink control information (for example, DL assignment).

In NR, as uplink control channel configurations (PUCCH formats) to be used for an HARQ-ACK transmission(s), a PUCCH format to be used for a UCI transmission of up to a certain number of bits and a PUCCH format to be used for UCI transmission of more than the certain number of bits are supported. The PUCCH format to be used for a UCI transmission of up to the certain number of bits (for example, up to 2 bits) may be referred to as PUCCH format 0 or PUCCH format 1. The PUCCH format to be used for UCI transmission of more than the certain number of bits (for example, more than 2 bits) may be referred to as PUCCH formats 3 to 5.

Figure 1:
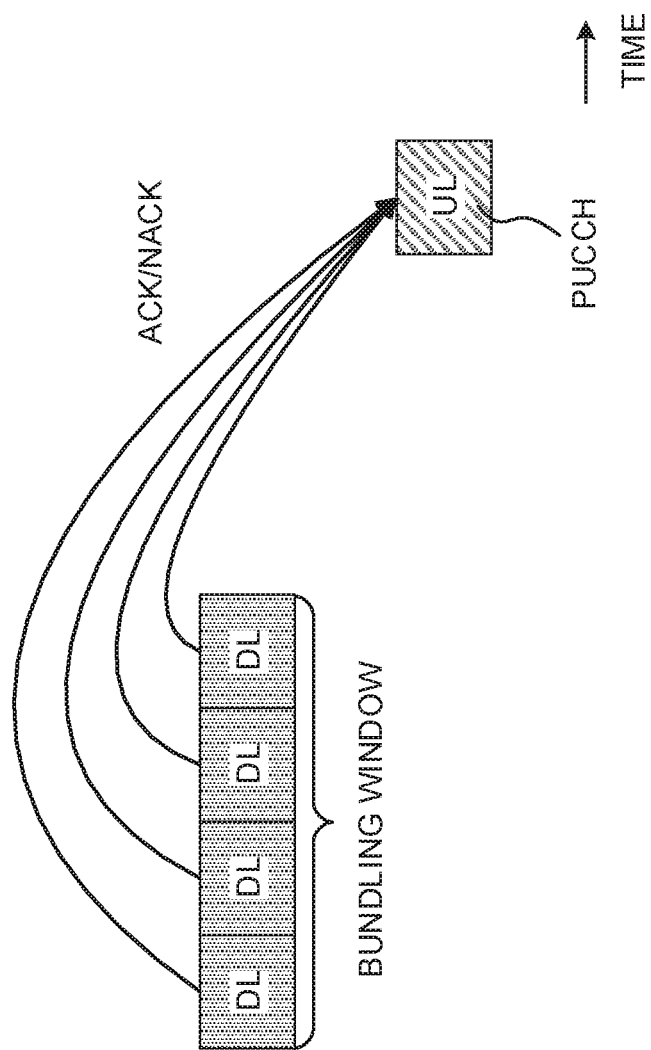
FIG. 1 is a diagram to show an example of HARQ-ACK feedback control.

FIG. 1 is a diagram to show an example of HARQ-ACK feedback control using a PUCCH. In this example, each part denoted by "DL" or "UL" indicates a certain resource (for example, time or frequency resource), and the period of each part corresponds to any time unit (for example, one or a plurality of slots, mini-slots, symbols, subframes, or the like). This is also applicable to examples to be given later.

In the case of FIG. 1, a UE transmits A/Ns corresponding to PDSCHs (here, four DL resources) scheduled in a certain range (bundling window) associated with HARQ-ACK feedback, by using a certain uplink control channel resource (PUCCH resource). Such a configuration that the UE is indicated with timings of HARQ-ACK feedback for the PDSCHs by using downlink control information (DL assignments) for scheduling the PDSCHs, may be employed.

When the mode of semi-statically determining HARQ-ACK codebook is configured, the UE performs HARQ-ACK feedback with the number of bits considering HARQ-ACKs for all the PDSCHs having a possibility of being scheduled in the certain range (bundling window). In other words, the UE controls HARQ-ACK feedback, based on a codebook size calculated in advance by using a higher layer parameter, irrespective of the number of PDSCHs to be scheduled or the number of pieces of DCI for scheduling PDSCHs.

Specifically, assuming that all the PDSCHs included in the bundling window are scheduled, the UE generates HARQ-ACK bits for all the PDSCHs. In this way, HARQ-ACK codebook can be semi-statically configured irrespective of the number of PDSCHs to be scheduled or the number of pieces of DCI for scheduling the PDSCHs.

Figure 2:
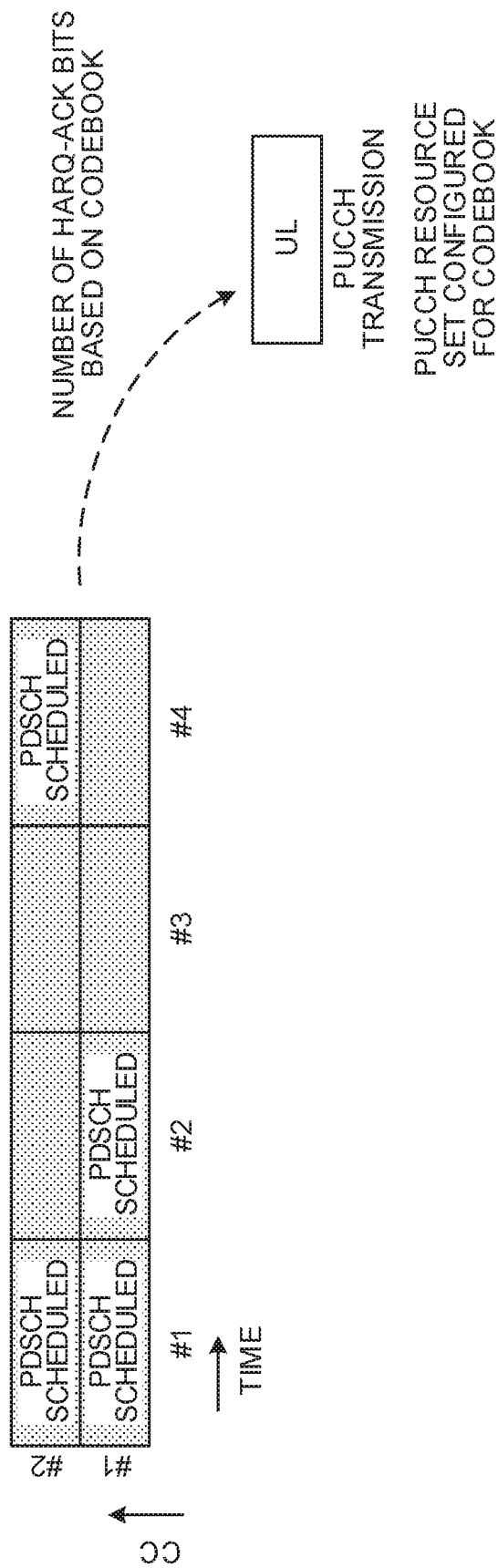
FIG. 2 is a diagram to show an example of HARQ-ACK feedback control in a mode of semi-statically determining HARQ-ACK codebook.

FIG. 2 shows an example of a case of semi-statically determining HARQ-ACK codebook to be multiplexed with a PUCCH. Note that FIG. 2 shows a case that two CCs (or cells) are configured for the UE and a bundling window corresponding to a PUCCH transmission is constituted with four time units (for example, four slots). The bundling window may be constituted based on HARQ-ACK timings indicated by downlink control information. Note that the number of CCs and the period of the bundling window are not limited to these. Although FIG. 2 shows a case that a spatial direction of each CC is one (for example, a transport block is one), the number of spatial directions is not limited to this.

In FIG. 2, a PDSCH is scheduled in each of CC #1 and CC #2 in the first slot. A PDSCH is scheduled in CC #1 in the second slot, no PDSCH is scheduled in the third slot, and a PDSCH is scheduled in CC #2 in the fourth slot. In other words, this corresponds to a case that four pieces of DL data are actually scheduled in the range of the bundling window (here, the total of eight (8=2CC*4 slots)).

The base station reports information related to the total number (here, eight) of pieces of DL data included in the bundling window, to the UE as a higher layer parameter. The UE determines a codebook size based on the higher layer parameter irrespective of the number (four in FIG. 2) of scheduled PDSCHs or the number of pieces of DCI for scheduling PDSCHs. For each PDSCH not scheduled in the bundling window, the UE transmits a NACK as feedback.

In this way, in a case of determining HARQ-ACK codebook irrespective of the number of DL transmissions to be scheduled, a number of HARQ-ACK bits need to be constantly transmitted even when the number of DL transmissions to be actually scheduled is small (for example, one or two). This may increase the processing load of the UE and may decrease the throughput and/or deteriorate the communication quality.

In view of these, the inventors of the present invention have focused on a certain PUCCH format (for example PUCCH format 0/1) supported for an HARQ-ACK transmission(s) of up to a certain number of bits and come up with the idea of controlling an HARQ-ACK transmission(s) by using a certain PUCCH format when the number of HARQ-ACK bits is up to a certain value even in a case of semi-statically configuring HARQ-ACK codebook.

Specifically, a UE transmits an HARQ-ACK with the number of bits up to the certain value, instead of the number of HARQ-ACK bits determined based on a higher layer parameter, when the number of HARQ-ACK bits is up to the certain value even in the case of semi-statically configuring HARQ-ACK codebook. Thus transmitting an HARQ-ACK in the number of bits up to the certain value in the certain PUCCH format is also referred to as "fallback PUCCH transmission."

Whether to employ the fallback PUCCH transmission may be determined based on the number of bits of an HARQ-ACK(s) to be transmitted as feedback (or the number of PDSCH transmissions which cause the HARQ-ACKs). Alternatively, this may be determined based on the type of cell for transmission of DL data causing the HARQ-ACK and/or a condition for the transmission (for example, the type of search space of DCI for scheduling a PDSCH), in addition to the number of HARQ-ACK bits.

In the case of semi-statically configuring HARQ-ACK codebook (for example, the number of bits more than the certain value), a PUCCH resource set to be used for an HARQ-ACK transmission of this codebook size is configured. The PUCCH resource set includes a plurality of PUCCH resources (also referred to as "PUCCH resource candidates"), and a PUCCH is transmitted by using a certain PUCCH resource selected from the plurality of PUCCH resources.

The plurality of PUCCH resources included in the PUCCH resource set may be configured in the UE through higher layer signaling. Selection of the certain PUCCH resource may be performed by using a certain field included in (or a certain field DCI included in and another parameter such as an RRC) DCI or the like.

In view of the above, the inventors of the present invention come up with the idea of configuring a PUCCH resource set for an HARQ-ACK transmission of up to a certain value, separately from a PUCCH resource set to be used for an HARQ-ACK transmission of a semi-statically configured codebook size in a case of supporting fallback PUCCH.

In addition, the inventors of the present invention come up with the idea of configuring the PUCCH resource set (or PUCCH resources) for an HARQ-ACK transmission of up to the certain value through at least one of UE-specific higher layer signaling (UE-specific RRC signalling) and UE-common higher layer signaling (UE-common RRC signalling).

An embodiment of the present disclosure will be described below in detail. The following aspects may be applied individually, or may be applied in combination. The following aspects to be carried out may be applied individually, or may be applied in combination.

In the following embodiment, HARQ-ACK may be interpreted as "UCI" or may be interpreted as UCI of another type such as "scheduling request (SR)" or "channel state information (CSI)." "2 bits" may be interpreted as a "certain number of bits." Note that, in the present description, "data," "data channel (for example, PUSCH)," and "data channel resource" may be interpreted as one another.

(First Aspect)

In a first aspect, a description will be given of an HARQ-ACK transmission in a case that fallback PUCCH transmission is supported in a configuration of semi-statically configuring HARQ-ACK codebook. In the following description, a case that a base station configures, in a UE, a mode of semi-statically determining HARQ-ACK codebook is described. However, this does not intend to limit applicable modes.

When the base station configures, in the UE, the mode of semi-statically determining HARQ-ACK codebook, the base station also configures a PUCCH resource set corresponding to the HARQ-ACK codebook (a first PUCCH resource set). When the HARQ-ACK codebook configured in the UE is of the number of HARQ-ACK bits more than a certain value (for example, two), the base station configures a PUCCH resource set for an HARQ-ACK transmission of up to the certain value (a second PUCCH resource set) separately from the first PUCCH resource set.

When the number of HARQ-ACK bits in a bundling window (or the number of received PDSCHs or the number of received PDCCHs each requiring an HARQ-ACK transmission) is more than the certain value, the UE transmits an HARQ-ACK generated based on the HARQ-ACK codebook, by using the first PUCCH resource set (refer to FIG. 2). Note that the bundling window may correspond to the number of PDCCHs or the number of PDSCHs which may be included in a space, time, and/or frequency domain derived from a semi-static parameter such as RRC signalling, or may be the number of PDCCHs or the number of PDSCHs which may be included in a space, time, and/or frequency domain derived based on dynamic signalling such as DCI in addition to a semi-static parameter such as an RRC signalling.

In contrast, when the number of HARQ-ACK bits in a bundling window (or the number of received PDSCHs or the number of received PDCCHs each requiring an HARQ-ACK transmission) is up to the certain value, the UE performs fallback PUCCH transmission. For example, the UE transmits an HARQ-ACK(s) of up to a certain number of bits (for example, two bits) by using the second PUCCH resource set in a certain PUCCH format (refer to FIG. 3).

Figure 3:
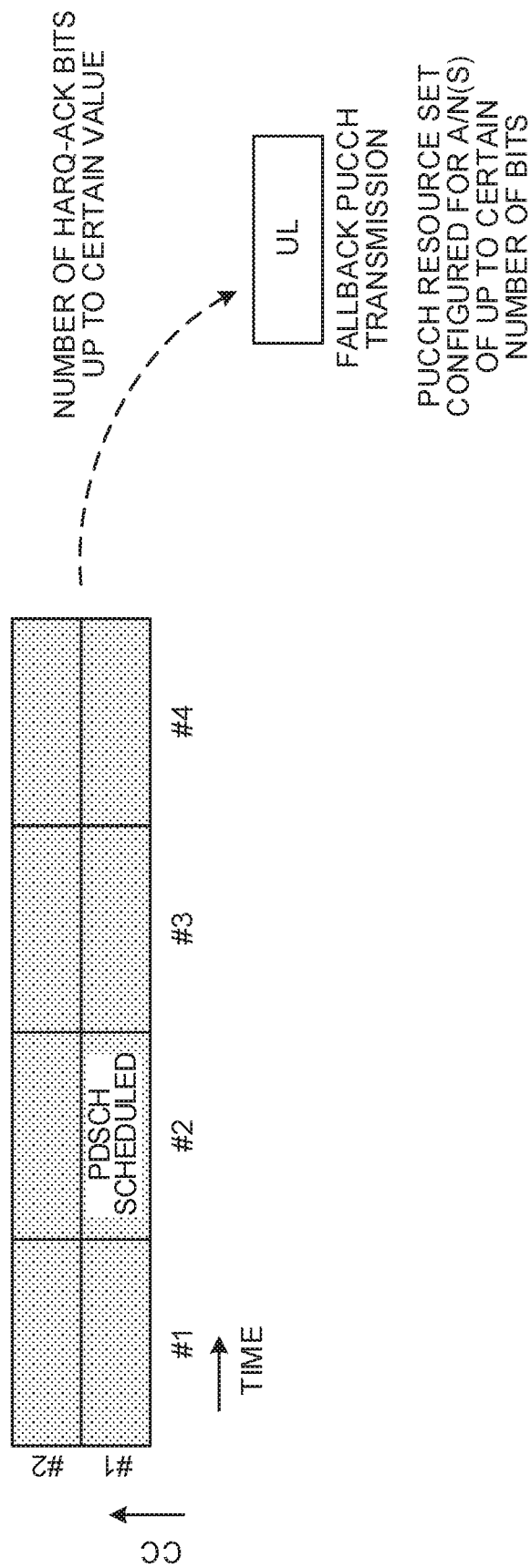
FIG. 3 is a diagram to show another example of HARQ-ACK feedback control in the mode of semi-statically determining HARQ-ACK codebook.

FIG. 3 shows a case that two CCs (or cells) are configured for the UE and a bundling window corresponding to a PUCCH transmission is constituted with four time units (for example, four slots). Note that the number of CCs and the period of the bundling window are not limited to these. Although the following description describes a case that a spatial direction of each CC is one (for example, a transport block is one), the number of spatial directions is not limited to this.

In FIG. 3, a PDSCH is scheduled in CC #1 in the second slot, and no PDSCH is scheduled in the first slot, the third slot, and the fourth slot. In other words, this corresponds to a case that one piece of DL data (PDSCH) is actually scheduled in the range of the bundling window (here, the total of eight (8=2CC*4 slots)).

When the UE performs HARQ-ACK feedback for one PDSCH in the bundling window, the UE controls an HARQ-ACK transmission by using a certain PUCCH format and the second PUCCH resource set. As the certain PUCCH format, the PUCCH format used for a transmission of up to the certain number bits (for example, PUCCH format 0/1) or the like may be used.

In this way, by employing fallback PUCCH transmission when an HARQ-ACKs to be transmitted as feedback is of up to the certain number of bits, not all the HARQ-ACKs corresponding to the bundling window need to be generated, which can reduce the processing load of the UE.

The UE selects a certain PUCCH resource from among the plurality of PUCCH resource candidates included in the second PUCCH resource set, to control the HARQ-ACK transmission. Selection of the certain PUCCH resource may be performed based on a certain field included in DCI (or the certain field included in the DCI and another parameter such as an RRC).

The second PUCCH resource set may be configured in the UE through at least one of UE-specific higher layer signaling (UE-specific RRC signalling) and UE-common higher layer signaling (UE-common RRC signalling).

For example, when the second PUCCH resource set is configured through UE-specific higher layer signaling, the UE uses the second PUCCH resource set configured through UE-specific higher layer signaling. In other words, the UE may preferentially use the second PUCCH resource set configured through UE-specific higher layer signaling, even when the second PUCCH resource set is configured through UE-common higher layer signaling.

In this case, when the second PUCCH resource set is not configured through UE-specific higher layer signaling, the UE may simply use the second PUCCH resource set configured through UE-common higher layer signaling.

The UE-common higher layer signaling may be higher layer signaling that reports system information, for example. In this case, the UE determines the second PUCCH resource set, based on the system information reported through the higher layer signaling. The system information reported through the higher layer signaling may be remaining minimum system information (RMSI), SIB1 and/or SIB2, or other system information (OSI).

The system information includes information related to a PUCCH resource set for which PUCCH format 0/1 is used. The PUCCH resource set included in the system information may be a PUCCH resource set to be used for an HARQ-ACK(s) (an HARQ-ACK(s) before RRC connection setup) for message 4 (Msg. 4) in a random access procedure. In other words, the UE may use the PUCCH resource set to be used for an HARQ-ACK(s) before configuring an RRC connection, as the second PUCCH resource set.

Note that different methods of selecting a PUCCH resource to be actually used for transmission from a PUCCH resource set may be employed between a case the second PUCCH resource set is configured through UE-specific higher layer signaling and a case that the second PUCCH resource set is configured through UE-common higher layer signaling. In other words, in a case of using the second PUCCH resource, the UE can select a PUCCH resource to be used for transmission, based on different rules between a case that the second PUCCH resource set is configured through UE-specific higher layer signaling and a case that the second PUCCH resource set is configured through UE-common higher layer signaling.

The different rules may be, for example, that a PUCCH resource is selected based on a certain field included in DCI in one case while a PUCCH resource is selected without using a field included in DCI in the other case. Alternatively, the different rules may be that, in one case, a PUCCH resource is selected based on an index of a resource element (CCE) of a PDCCH for scheduling the PDSCH to which the HARQ-ACK to be transmitted on the PUCCH corresponds, while in the other case, a PUCCH resource is selected without using the index of the CCE.

In this way, by allowing the PUCCH resource set configured through UE-common higher layer signaling to be used as the second PUCCH resource set, it is possible to perform an HARQ-ACK transmission of up to the certain number of bits even when no PUCCH resource set is configured through UE-specific higher layer signaling. Hence, fallback PUCCH transmission can be appropriately performed, which can prevent an increase in processing load of the UE.

(Second Aspect)

In a second aspect, a description will be given of a case of controlling whether to employ fallback PUCCH transmission, based on at least one of the number of HARQ-ACK bits (or the number of received PDSCHs or the number of received PDCCHs each requiring an HARQ-ACK transmission), the type of CC (or cell) in which a PDSCH is transmitted, and a condition of transmitting a PDSCH/DCI. The condition of transmitting the PDSCH and/or DCI indicates, for example, the type of search space to be used for a transmission of DCI for scheduling a PDSCH, or the like. An application example of fallback PUCCH transmission will be described below.

Application Example 1

In Application Example 1, whether or not to employ fallback PUCCH transmission is controlled based on the number of PDSCHs (the number of HARQ-ACK bits) in a bundling window.

For example, when one PDSCH is transmitted in only one serving cell (or when one HARQ-ACK for the PDSCH is transmitted as feedback), the UE employs fallback PUCCH transmission (refer to FIG. 3). In this case, the UE selects a certain PUCCH resource from the second PUCCH resource set configured for an HARQ-ACK transmission of the certain number of bits (for example, up to two bits) and transmits an HARQ-ACK.

The UE may determine the certain PUCCH resource from the second PUCCH resource set, based on information included in DCI for scheduling the PDSCH. For example, the UE may determine the certain PUCCH resource, based on at least one of an ARI field and an HARQ-ACK timing indicator field included in the DCI. The ARI field may be a TPC command field.

The UE may determine the certain PUCCH resource by using other parameter (for example, information reported implicitly (implicit information)) in addition to the information (for example, a certain field) included in the DCI. Examples of the other parameter include a CCE index corresponding to the DCI for scheduling the PDSCH, a control resource set index to be used for a transmission of the DCI, and so on.

FIG. 3 shows a case of employing fallback PUCCH transmission when the number of PDSCHs (the number of HARQ-ACK bits) in a bundling window is one, but this is not restrictive. For example, such a configuration that fallback PUCCH transmission is employed when the number of PDSCHs (the number of HARQ-ACK bits) in a bundling window is up to two may be employed.

Figure 4:
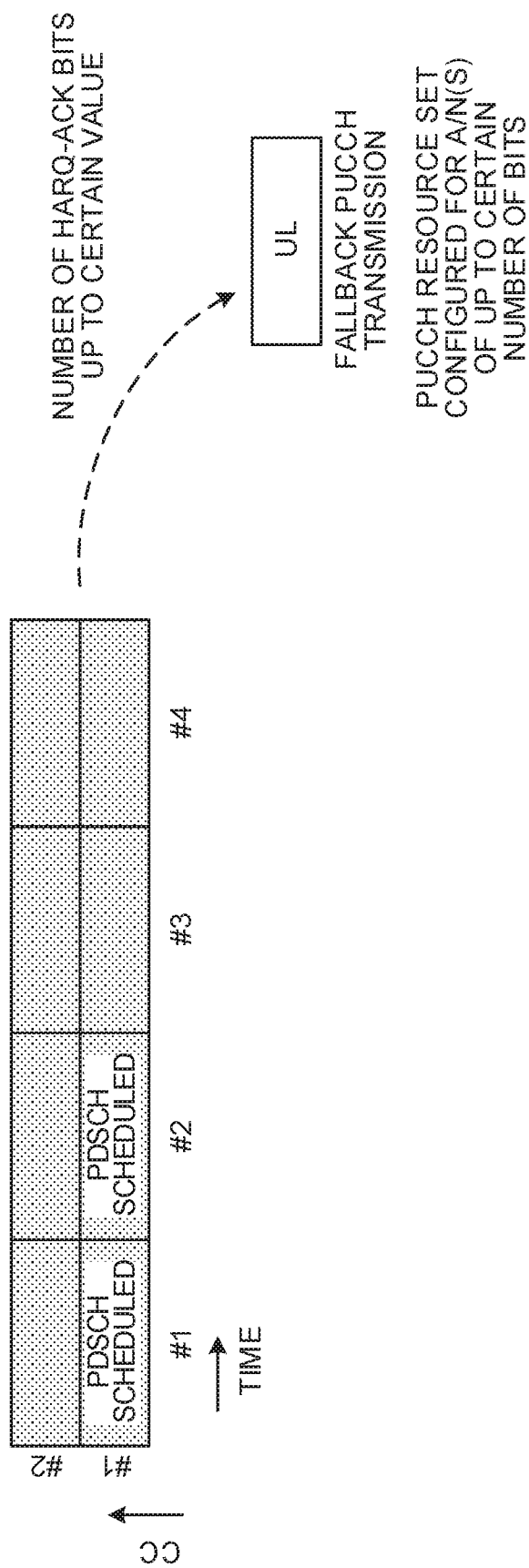
FIG. 4 is a diagram to show another example of HARQ-ACK feedback control in the mode of semi-statically determining HARQ-ACK codebook.
Figure 5:
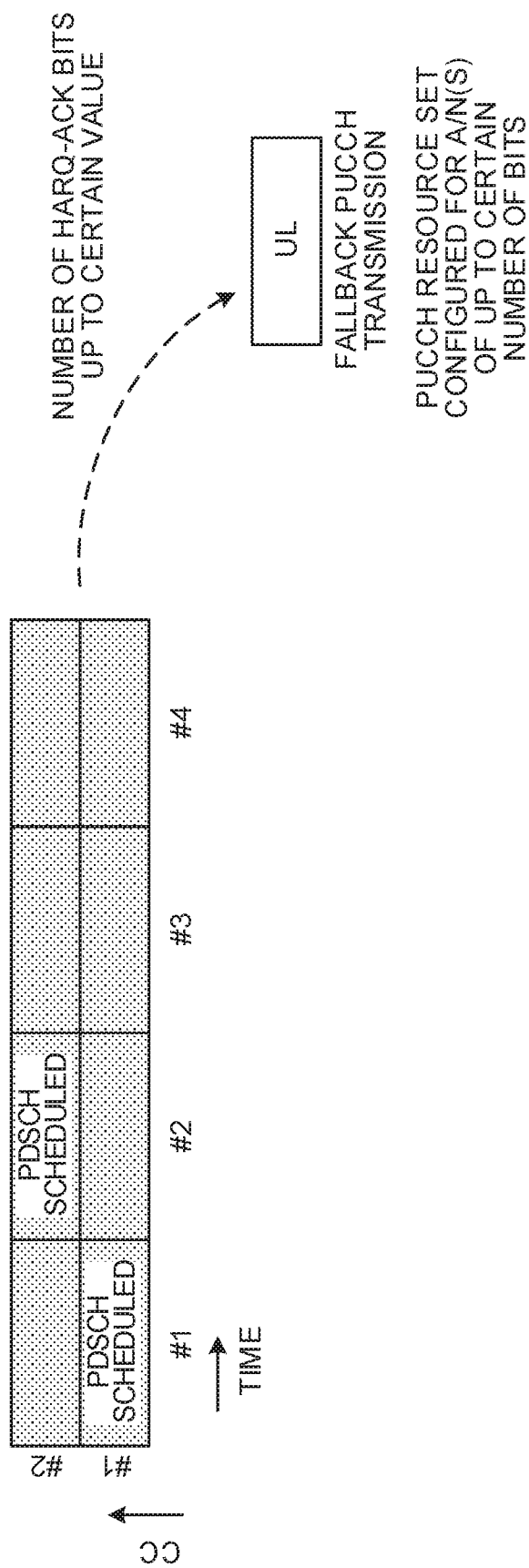
FIG. 5 is a diagram to show another example of HARQ-ACK feedback control in the mode of semi-statically determining HARQ-ACK codebook.

For example, when one or two PDSCHs are transmitted in one or two serving cells (or when one or two HARQ-ACKs for the PDSCH(s) are transmitted as feedback), the UE may employ fallback PUCCH transmission (refer to FIG. 4 and FIG. 5).

FIG. 4 shows a case in which two PDSCHs (PDSCHs to be transmitted in different slots) are transmitted in one serving cell (here, CC #1) in a bundling window. FIG. 5 shows a case in which one PDSCH is transmitted in each of two serving cells (here, CC #1 and CC #2) in a bundling window.

In FIGS. 4 and 5, the UE employs fallback PUCCH transmission to transmit HARQ-ACKs for two PDSCHs as feedback in the bundling window. The UE selects a certain PUCCH resource from the second PUCCH resource and transmits the HARQ-ACKs for the two PDSCHs.

The UE determines the certain PUCCH resource from the second PUCCH resource set, based on information included in DCI for scheduling the PDSCHs. When a DCI for scheduling a PDSCH is transmitted for each of the two PDSCH, the UE may use information included in one of the pieces of DCI (for example, the DCI transmitted in the CC having a smaller index and/or the DCI transmitted earlier in a time direction). Alternatively, such a configuration that information indicating the same PUCCH resource is included in both of the pieces of DCI may be employed.

In this way, by controlling whether or not to employ fallback PUCCH transmission, based on the number of PDSCHs (the number of HARQ-ACK bits) in a bundling window, it is possible to employ fallback PUCCH transmission irrespective of the type of CC in which a PDSCH is to be transmitted.

Application Example 2

In Application Example 2, whether or not to employ fallback PUCCH transmission is controlled based on the type of CC (or cell) in addition to the number of PDSCHs (the number of HARQ-ACK bits) in a bundling window.

For example, when one PDSCH is transmitted in only one particular cell (or when an HARQ-ACK for the PDSCH is transmitted as feedback), the UE employs fallback PUCCH transmission (refer to FIG. 3). The one particular cell (CC #1 in FIG. 3) may be a primary cell (or a PSCell or a PUCCH SCell), for example. Limiting employment of fallback PUCCH transmission to PDSCH transmission in a primary cell can make fallback control more robust. This is because the primary cell is an important cell for ensuring a connection among the cells to which the UE connects.

A method of selecting a certain PUCCH resource from the second PUCCH resource set may simply be performed similarly in Application Example 1 above.

Although FIG. 3 shows the case of employing fallback PUCCH transmission when the number of PDSCHs to be transmitted in one particular cell (the number of HARQ-ACK bits for the PDSCH) in a bundling window is one, the number of PDSCHs is not limited to this. For example, such a configuration that fallback PUCCH transmission is employed when the number of PDSCHs to be transmitted in one particular cell is up to two may be employed (refer to FIG. 4).

FIG. 4 shows a case in which two PDSCHs are transmitted in one particular cell (here, CC #1) in a bundling window. In this case, since only HARQ-ACKs for the two PDSCHs transmitted in the particular cell are transmitted as feedback, the UE employs fallback PUCCH transmission. The UE transmits the HARQ-ACKs for the two PDSCHs by using the certain PUCCH resource selected from the second PUCCH resource set.

In this way, by controlling whether or not to employ fallback PUCCH transmission in consideration additionally of the type of CC (or cell) in which a PDSCH is to be transmitted, it is possible to control fallback PUCCH transmission according to the type of CC in which the PDSCH is to be transmitted.

Application Example 3

In Application Example 3, whether or not to employ fallback PUCCH transmission is controlled based on a condition of transmitting a PDSCH and/or DCI in addition to the number of PDSCHs (the number of HARQ-ACK bits) and the type of CC (or cell) in a bundling window.

For example, when one PDSCH scheduled by using DCI (or a PDCCH) using a particular type of search space is transmitted in only one particular cell, the UE employs fallback PUCCH transmission. The one particular cell (CC #1 in FIG. 3) may be a primary cell (or a PSCell or a PUCCH SCell), for example. The particular search space may be a common search space (CSS).

Limiting employment of fallback PUCCH transmission to an HARQ-ACK for a PDSCH transmission scheduled on a PDCCH (DCI) mapped to a common search space enables fallback control to be performed more appropriately. A radio base station may simply perform scheduling for a PDSCH by using the common search space only when desiring a PUCCH from the UE to fall back.

A method of selecting a certain PUCCH resource from the second PUCCH resource set may simply be performed similarly in Application Example 1 above.

Although FIG. 3 shows the case in which fallback PUCCH transmission is employed when one PDSCH scheduled by using DCI (or a PDCCH) using a particular type of search space is transmitted in only one particular cell, the number of PDSCHs is not limited to this. For example, such a configuration that fallback PUCCH transmission is employed when the number of PDSCHs scheduled by using DCI (or a PDCCH) using a particular type of search space is up to two (refer to FIG. 4).

FIG. 4 shows a case in which two PDSCHs scheduled on PDCCHs to be transmitted in the common search space in one particular cell (here, CC #1) in a bundling window are transmitted. In this case, since only HARQ-ACKs for the two PDSCHs transmitted in the particular cell are transmitted as feedback, the UE employs fallback PUCCH transmission. The UE transmits the HARQ-ACKs for the two PDSCHs by using the certain PUCCH resource selected from the second PUCCH resource set.

In this way, by controlling whether or not to employ fallback PUCCH transmission in consideration additionally of the type of search space to be used for transmission of a PDCCH (or DCI) for scheduling a PDSCH, it is possible to perform fallback control more appropriately. The radio base station may simply perform scheduling for a PDSCH by using the common search space only when desiring a PUCCH from the UE to fall back.

Note that, although Application Example 3 describes the case of controlling employment of fallback PUCCH transmission in consideration of the type of particular search space, the type to be taken into consideration is not limited to this. Fallback PUCCH transmission may be controlled based on the type of control resource set (CORESET) or the like instead of the type of search space.

(Radio Communication System)

A structure of a radio communication system according to one embodiment of the present invention will be described below. In this radio communication system, communication is performed by using any of the radio communication methods according to the embodiments of the present invention described above, or a combination of these.

Figure 6:
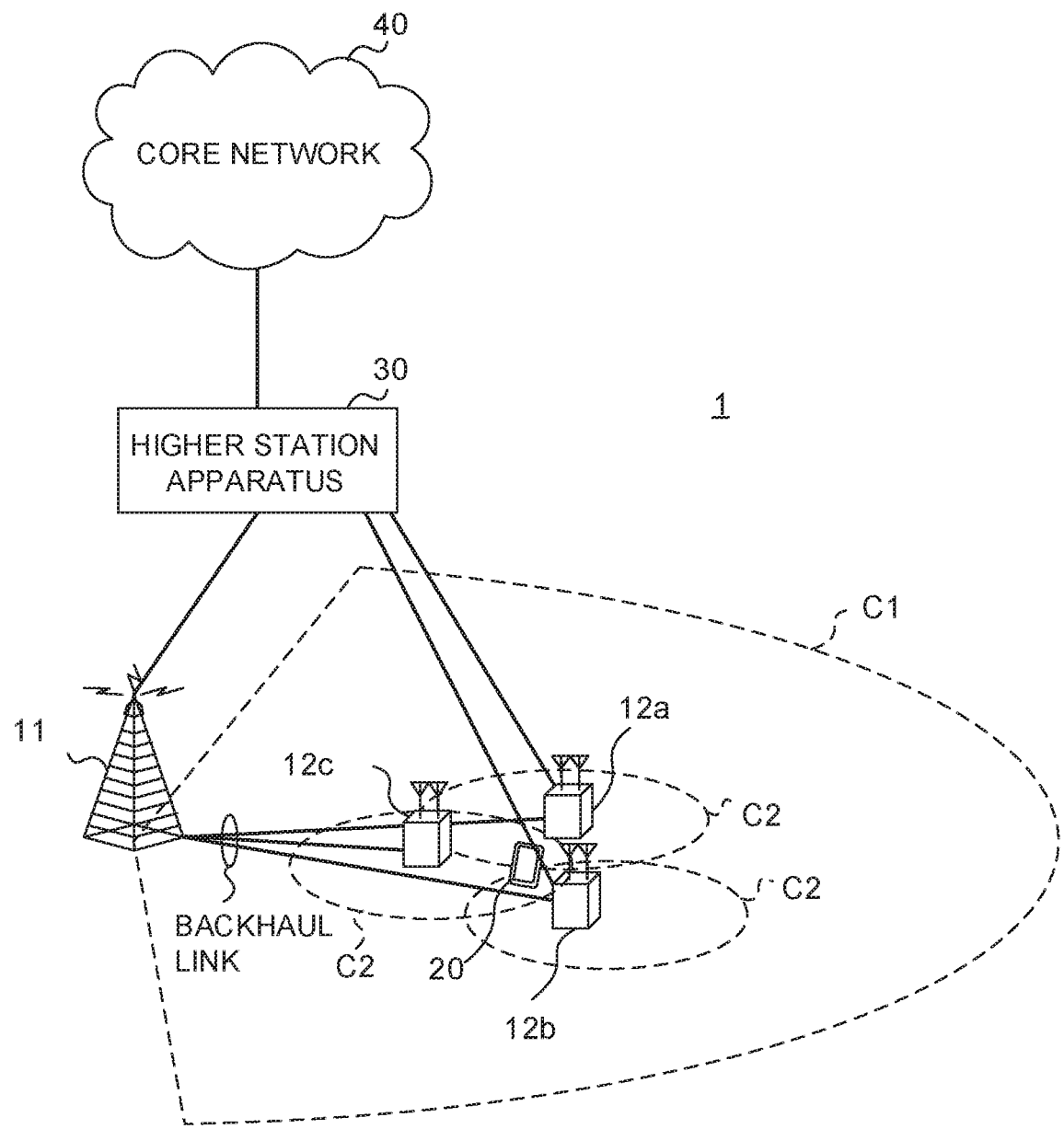
FIG. 6 is a diagram to show an example of a schematic structure of a radio communication system according to the present embodiment.

FIG. 6 is a diagram to show an example of a schematic structure of a radio communication system according to one embodiment of the present invention. A radio communication system 1 can adopt carrier aggregation (CA) and/or dual connectivity (DC) to group a plurality of fundamental frequency blocks (component carriers) into one, where the system bandwidth in LTE systems (for example, 20 MHz) constitutes one unit.

Note that the radio communication system 1 may be referred to as LTE (Long Term Evolution), LTE-A (LTE-Advanced), LTE-B (LTE-Beyond), SUPER 3G, IMT-Advanced, 4G (4th generation mobile communication system), 5G (5th generation mobile communication system), NR (New Radio), FRA (Future Radio Access), New-RAT (Radio Access Technology), or the like, or may be referred to as a system for implementing these.

The radio communication system 1 includes a radio base station 11 that forms a macro cell C1 having a relatively wide coverage, and radio base stations 12 (12a to 12c) that form small cells C2, which are arranged within the macro cell C1 and are narrower than the macro cell C1. Also, user terminals 20 are placed in the macro cell C1 and in each small cell C2. Arrangement, the number, and the like of each of the cells and the user terminals 20 are not limited to those shown in FIG. 6.

The user terminals 20 can connect with both the radio base station 11 and the radio base stations 12. It is assumed that the user terminal 20 uses the macro cell C1 and the small cells C2 at the same time, by using CA or DC. The user terminal 20 may apply CA or DC by using a plurality of cells (CCs) (for example, 5 or less CCs, 6 or more CCs).

Between the user terminals 20 and the radio base station 11, communication can be carried out using a carrier of a relatively low frequency band (for example, 2 GHz) and a narrow bandwidth (also referred to as an existing carrier, a legacy carrier, and so on). Meanwhile, between the user terminals 20 and the radio base stations 12, a carrier of a relatively high frequency band (for example, 3.5 GHz, 5 GHz, and so on) and a wide bandwidth may be used, or the same carrier as that used with the radio base station 11 may be used. Note that the structure of the frequency band for use in each radio base station is by no means limited to these.

A structure may be employed in which wired connection (for example, an optical fiber in compliance with the CPRI (Common Public Radio Interface), an X2 interface, and so on) or wireless connection is established between the radio base station 11 and the radio base stations 12 (or between two radio base stations 12).

The radio base station 11 and the radio base stations 12 are each connected with a higher station apparatus 30, and are connected with a core network 40 via the higher station apparatus 30. Note that the higher station apparatus 30 may be, for example, access gateway apparatus, a radio network controller (RNC), a mobility management entity (MME), and so on, but is by no means limited to these. Also, each radio base station 12 may be connected with the higher station apparatus 30 via the radio base station 11.

Note that the radio base station 11 is a radio base station having a relatively wide coverage, and may be referred to as a "macro base station," a "central node," an "eNB (eNodeB)," a "transmitting/receiving point," and so on. Also, the radio base stations 12 are radio base stations having local coverages, and may be referred to as "small base stations," "micro base stations," "pico base stations," "femto base stations," "HeNBs (Home eNodeBs)," "RRHs (Remote Radio Heads)," "transmitting/receiving points," and so on. Hereinafter, the radio base stations 11 and 12 will be collectively referred to as "radio base stations 10," unless specified otherwise.

The user terminals 20 are terminals to support various communication schemes such as LTE and LTE-A, and may include not only mobile communication terminals (mobile stations) but also stationary communication terminals (fixed stations).

In the radio communication system 1, as radio access schemes, orthogonal frequency division multiple access (OFDMA) is applied in the downlink, and single carrier frequency division multiple access (SC-FDMA) and/or OFDMA is applied in the uplink.

OFDMA is a multi-carrier communication scheme to perform communication by dividing a frequency band into a plurality of narrow frequency bands (subcarriers) and mapping data to each subcarrier. SC-FDMA is a single-carrier communication scheme to mitigate interference between terminals by dividing the system bandwidth into bands formed with one or continuous resource blocks per terminal, and allowing a plurality of terminals to use mutually different bands. Note that the uplink and downlink radio access schemes are not limited to the combinations of these, and other radio access schemes may be used.

In the radio communication system 1, a downlink shared channel (PDSCH (Physical Downlink Shared Channel)), which is used by each user terminal 20 on a shared basis, a broadcast channel (PBCH (Physical Broadcast Channel)), downlink L1/L2 control channels, and so on, are used as downlink channels. User data, higher layer control information, SIBs (System Information Blocks), and so on are communicated in the PDSCH. Also, MIBs (Master Information Blocks) are communicated in the PBCH.

The downlink L1/L2 control channels include a PDCCH (Physical Downlink Control Channel), an EPDCCH (Enhanced Physical Downlink Control Channel)), a PCFICH (Physical Control Format Indicator Channel), a PHICH (Physical Hybrid-ARQ Indicator Channel), and so on. Downlink control information (DCI) including PDSCH and/or PUSCH scheduling information is communicated in the PDCCH, for example.

Note that scheduling information may be notified in DCI. For example, DCI for scheduling DL data reception may be referred to as a DL assignment, and DCI for scheduling UL data transmission may be referred to as a UL grant.

The number of OFDM symbols to use for the PDCCH is communicated in the PCFICH. Delivery confirmation information (for example, also referred to as retransmission control information, an HARQ-ACK, an ACK/NACK, and so on) of an HARQ (Hybrid Automatic Repeat reQuest) for the PUSCH is communicated in the PHICH. The EPDCCH is frequency-division-multiplexed with the PDSCH (downlink shared data channel) and used to communicate DCI and so on, like the PDCCH.

In the radio communication system 1, as uplink channels, an uplink shared channel (PUSCH (Physical Uplink Shared Channel)), which is used by each user terminal 20 on a shared basis, an uplink control channel (PUCCH (Physical Uplink Control Channel)), a random access channel (PRACH (Physical Random Access Channel)), and so on are used. User data, higher layer control information, and so on are communicated in the PUSCH. Downlink radio quality information (CQI (Channel Quality Indicator)), delivery confirmation information, a scheduling request (SR), and so on are communicated in the PUCCH. By means of the PRACH, random access preambles for establishing connections with cells are communicated.

In the radio communication system 1, as downlink reference signals, a cell-specific reference signal (CRS), a channel state information-reference signal (CSI-RS), a demodulation reference signal (DMRS), a positioning reference signal (PRS), and so on are communicated. In the radio communication system 1, as uplink reference signals, a sounding reference signal (SRS), a demodulation reference signal (DMRS), and so on are communicated. Note that the DMRS may be referred to as a user terminal-specific reference signal (UE-specific Reference Signal). Communicated reference signals are not limited to these signals.

<Radio Base Station>

Figure 7:
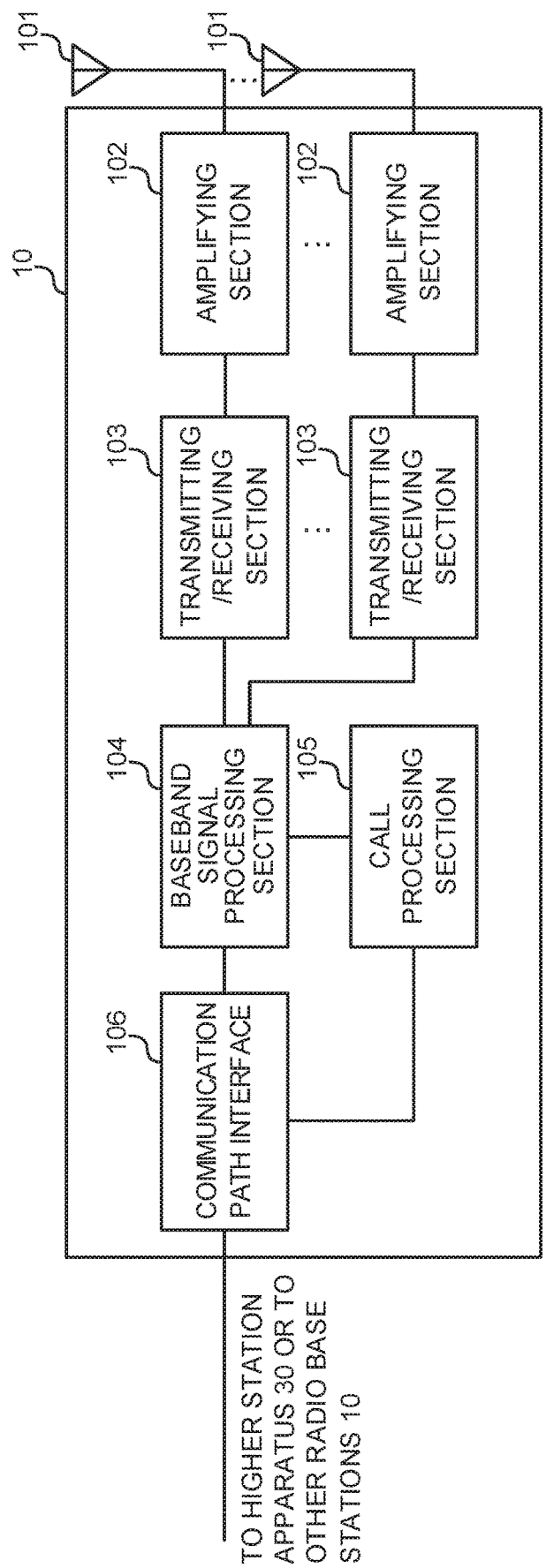
FIG. 7 is a diagram to show an example of an overall structure of a radio base station according to the present embodiment.

FIG. 7 is a diagram to show an example of an overall structure of a radio base station according to one embodiment of the present invention. A radio base station 10 is provided with a plurality of transmitting/receiving antennas 101, amplifying sections 102, transmitting/receiving sections 103, a baseband signal processing section 104, a call processing section 105, and a communication path interface 106. Note that the radio base station 10 may be configured to include one or more transmitting/receiving antennas 101, one or more amplifying sections 102, and one or more transmitting/receiving sections 103.

User data to be transmitted from the radio base station 10 to a user terminal 20 on the downlink is input from the higher station apparatus 30 to the baseband signal processing section 104, via the communication path interface 106.

In the baseband signal processing section 104, the user data is subjected to transmission processes, such as a PDCP (Packet Data Convergence Protocol) layer process, division and coupling of the user data, RLC (Radio Link Control) layer transmission processes such as RLC retransmission control, MAC (Medium Access Control) retransmission control (for example, an HARQ transmission process), scheduling, transport format selection, channel coding, an inverse fast Fourier transform (IFFT) process, and a pre-coding process, and the result is forwarded to each transmitting/receiving section 103. Furthermore, downlink control signals are also subjected to transmission processes such as channel coding and inverse fast Fourier transform, and the result is forwarded to each transmitting/receiving section 103.

The transmitting/receiving sections 103 convert baseband signals that are pre-coded and output from the baseband signal processing section 104 on a per antenna basis, to have radio frequency bands and transmit the result. The radio frequency signals having been subjected to frequency conversion in the transmitting/receiving sections 103 are amplified in the amplifying sections 102, and transmitted from the transmitting/receiving antennas 101. The transmitting/receiving sections 103 can be constituted with transmitters/receivers, transmitting/receiving circuits, or pieces of transmitting/receiving apparatus that can be described based on general understanding of the technical field to which the present invention pertains. Note that each transmitting/receiving section 103 may be structured as a transmitting/receiving section in one entity, or may be constituted with a transmitting section and a receiving section.

Meanwhile, as for uplink signals, radio frequency signals that are received in the transmitting/receiving antennas 101 are amplified in the amplifying sections 102. The transmitting/receiving sections 103 receive the uplink signals amplified in the amplifying sections 102. The transmitting/receiving sections 103 convert the received signals into the baseband signal through frequency conversion and output to the baseband signal processing section 104.

In the baseband signal processing section 104, user data that is included in the input uplink signals is subjected to a fast Fourier transform (FFT) process, an inverse discrete Fourier transform (IDFT) process, error correction decoding, a MAC retransmission control receiving process, and RLC layer and PDCP layer receiving processes, and forwarded to the higher station apparatus 30 via the communication path interface 106. The call processing section 105 performs call processing (setting up, releasing, and so on) of communication channels, manages the state of the radio base station 10, and manages the radio resources, for example.

The communication path interface 106 transmits and/or receives signals to and/or from the higher station apparatus 30 via a certain interface. Also, the communication path interface 106 may transmit and/or receive signals (backhaul signaling) with other radio base stations 10 via an inter-base station interface (for example, an optical fiber in compliance with the CPRI (Common Public Radio Interface) and an X2 interface).

The transmitting/receiving sections 103 report whether to employ the mode of semi-statically determining HARQ-ACK codebook or the mode of dynamically determining HARQ-ACK codebook, to a UE through higher layer signaling or the like. The transmitting/receiving sections 103 receive HARQ-ACKs (HARQ-ACKs based on the codebook and HARQ-ACKs for which fallback PUCCH transmission is employed) transmitted from the UE.

The transmitting/receiving sections 103 report information related to a PUCCH resource set corresponding to HARQ-ACKs transmitted based on the HARQ-ACK codebook and a PUCCH resource set to be used for an HARQ-ACK transmission of up to the certain number of bits, to the UE through higher layer signaling or the like. The transmitting/receiving sections 103 may transmit information indicating a certain PUCCH resource among a plurality of PUCCH resource candidates included in the corresponding PUCCH resource set, in downlink control information or the like.

Figure 8:
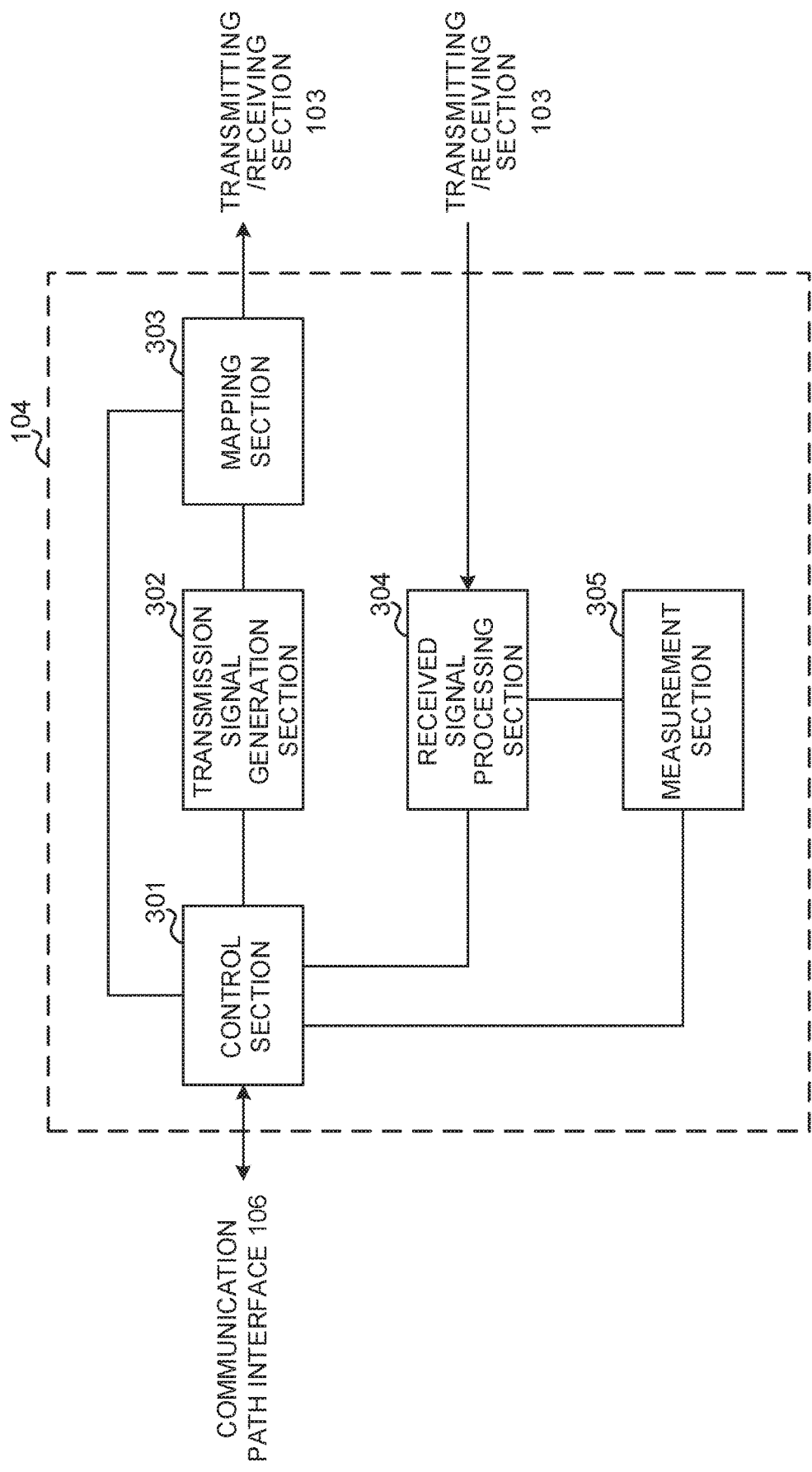
FIG. 8 is a diagram to show an example of a functional structure of the radio base station according to the present embodiment.

FIG. 8 is a diagram to show an example of a functional structure of the radio base station according to one embodiment of the present invention. Note that, although this example primarily shows functional blocks that pertain to characteristic parts of the present embodiment, the radio base station 10 includes other functional blocks that are necessary for radio communication as well.

The baseband signal processing section 104 includes at least a control section (scheduler) 301, a transmission signal generation section 302, a mapping section 303, a received signal processing section 304, and a measurement section 305. Note that these structures only need to be included in the radio base station 10, and a part or all of the structures may not be included in the baseband signal processing section 104.

The control section (scheduler) 301 controls the whole of the radio base station 10. The control section 301 can be constituted with a controller, a control circuit, or control apparatus that can be described based on general understanding of the technical field to which the present invention pertains.

The control section 301 controls, for example, signal generation of the transmission signal generation section 302, signal mapping of the mapping section 303, and so on. The control section 301 controls a signal receiving process of the received signal processing section 304, signal measurement of the measurement section 305, and so on.

The control section 301 controls scheduling (for example, resource allocation) of system information, a downlink data signal (for example, a signal transmitted on the PDSCH), and a downlink control signal (for example, a signal transmitted on the PDCCH and/or the EPDCCH, delivery confirmation information, and so on). The control section 301 controls generation of a downlink control signal, a downlink data signal, and so on, based on the results determining whether retransmission control for an uplink data signal is required or not, for example. The control section 301 performs control of scheduling of synchronization signals (for example, PSS (Primary Synchronization Signal)/SSS (Secondary Synchronization Signal)), downlink reference signals (for example, CRS, CSI-RS, and DMRS), and so on.

The control section 301 performs control for configuring the first PUCCH resource set corresponding to HARQ-ACKs to be transmitted based on the HARQ-ACK codebook and the second PUCCH resource set to be used for an HARQ-ACK transmission of up to the certain number of bits. For example, the control section 301 performs such control as to configure, as the second PUCCH resource set, at least one of a PUCCH resource set configured through higher layer signaling in a UE-specific manner and a PUCCH resource set configured through higher layer signaling in a UE-common manner.

The transmission signal generation section 302 generates downlink signals (downlink control signals, downlink data signals, downlink reference signals, and so on), based on commands from the control section 301, and outputs the generated downlink signals to the mapping section 303. The transmission signal generation section 302 can be constituted with a signal generator, a signal generation circuit, or signal generation apparatus that can be described based on general understanding of the technical field to which the present invention pertains.

The transmission signal generation section 302 generates, for example, a DL assignment for notifying downlink data assignment information and/or a UL grant for notifying uplink data assignment information, based on commands from the control section 301. Both the DL assignment and the UL grant are DCI, and follow a DCI format. The downlink data signals are subjected to a coding process and a modulation process, according to a coding rate, a modulation scheme, and so on that is determined based on channel state information (CSI) from each user terminal 20, for example.

The mapping section 303 maps the downlink signals generated in the transmission signal generation section 302 to certain radio resources, based on commands from the control section 301, and outputs these to the transmitting/receiving sections 103. The mapping section 303 can be constituted with a mapper, a mapping circuit, or mapping apparatus that can be described based on general understanding of the technical field to which the present invention pertains.

The received signal processing section 304 performs a receiving process (for example, demapping, demodulation, decoding, and so on) on the received signals input from the transmitting/receiving sections 103. Here, the received signals are, for example, uplink signals transmitted from the user terminal 20 (uplink control signals, uplink data signals, uplink reference signals, and so on). The received signal processing section 304 can be constituted with a signal processor, a signal processing circuit, or signal processing apparatus that can be described based on general understanding of the technical field to which the present invention pertains.

The received signal processing section 304 outputs information decoded through the receiving process to the control section 301. For example, when a PUCCH including an HARQ-ACK is received, the HARQ-ACK is output to the control section 301. The received signal processing section 304 outputs the received signals and/or the signals after the receiving process to the measurement section 305.

The measurement section 305 conducts measurements with respect to the received signals. The measurement section 305 can be constituted with a measurer, a measurement circuit, or measurement apparatus that can be described based on general understanding of the technical field to which the present invention pertains.

For example, the measurement section 305 may perform RRM (Radio Resource Management) measurement, CSI (Channel State Information) measurement, and so on, based on the received signals. The measurement section 305 may conduct measurements with respect to reception power (for example, RSRP (Reference Signal Received Power)), reception quality (for example, RSRQ (Reference Signal Received Quality) and SINR (Signal To Interference Plus Noise Ratio)), signal intensity (for example, RSSI (Received Signal Strength Indicator)), channel information (for example, CSI), and so on. The measurement results may be output to the control section 301.

<User Terminal>

Figure 9:
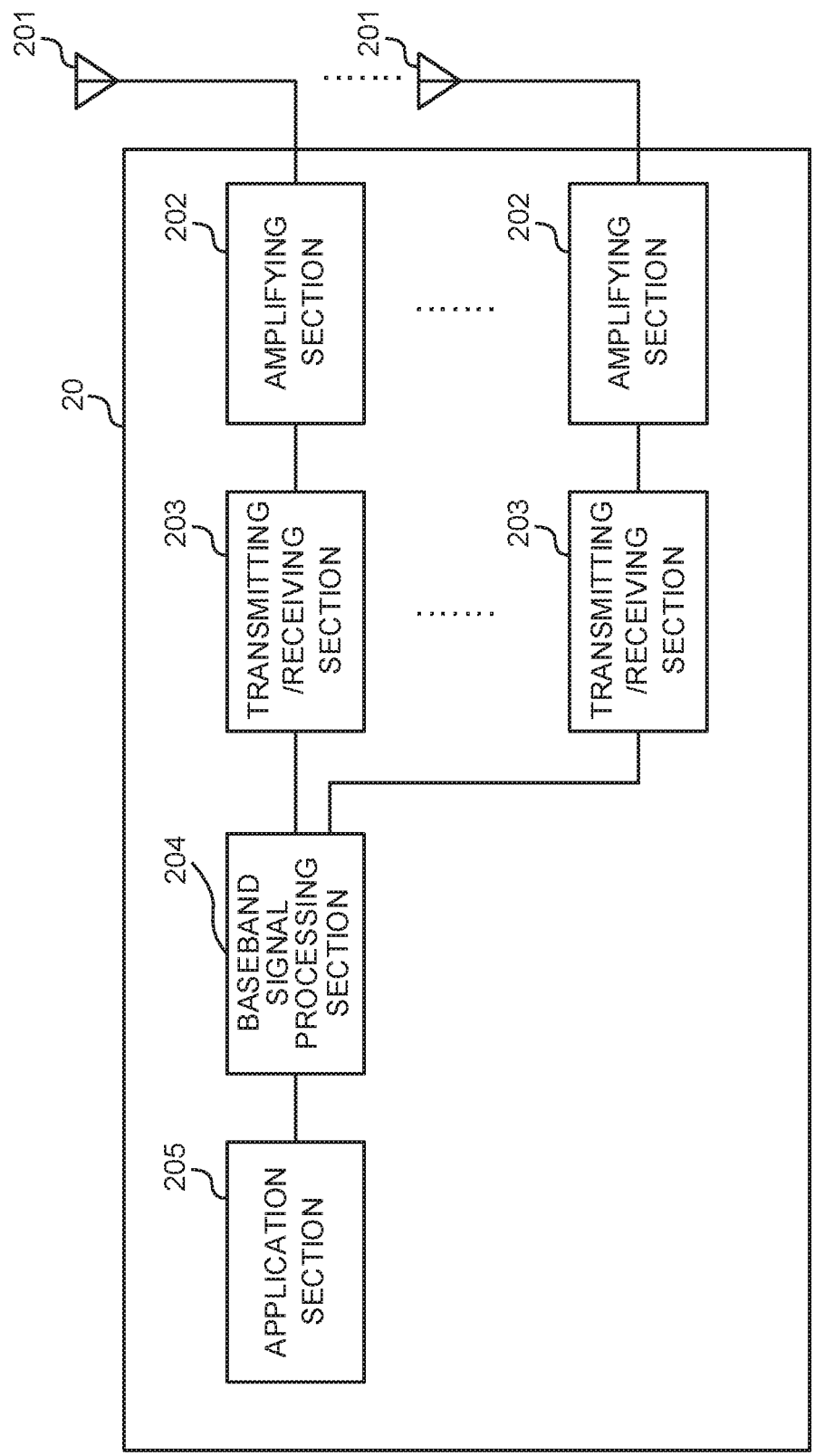
FIG. 9 is a diagram to show an example of an overall structure of a user terminal according to the present embodiment.

FIG. 9 is a diagram to show an example of an overall structure of a user terminal according to one embodiment of the present invention. Each user terminal 20 is provided with a plurality of transmitting/receiving antennas 201, amplifying sections 202, transmitting/receiving sections 203, a baseband signal processing section 204, and an application section 205. Note that the user terminal 20 may be configured to include one or more transmitting/receiving antennas 201, one or more amplifying sections 202, and one or more transmitting/receiving sections 203.

Radio frequency signals that are received in the transmitting/receiving antennas 201 are amplified in the amplifying sections 202. The transmitting/receiving sections 203 receive downlink signals amplified in the amplifying sections 202. The transmitting/receiving sections 203 convert the received signals into baseband signals through frequency conversion, and output the baseband signals to the baseband signal processing section 204. The transmitting/receiving sections 203 can be constituted with transmitters/receivers, transmitting/receiving circuits, or pieces of transmitting/receiving apparatus that can be described based on general understanding of the technical field to which the present invention pertains. Note that each transmitting/receiving section 203 may be structured as a transmitting/receiving section in one entity, or may be constituted with a transmitting section and a receiving section.

The baseband signal processing section 204 performs, on each input baseband signal, an FFT process, error correction decoding, a retransmission control receiving process, and so on. The downlink user data is forwarded to the application section 205. The application section 205 performs processes related to higher layers above the physical layer and the MAC layer, and so on. Broadcast information, out of the downlink data, may also be forwarded to the application section 205.

Meanwhile, the uplink user data is input from the application section 205 to the baseband signal processing section 204. The baseband signal processing section 204 performs a retransmission control transmission process (for example, an HARQ transmission process), channel coding, precoding, a discrete Fourier transform (DFT) process, an IFFT process, and so on, and the result is forwarded to each transmitting/receiving section 203. The transmitting/receiving sections 203 convert the baseband signals output from the baseband signal processing section 204 to have radio frequency band and transmit the result. The radio frequency signals having been subjected to frequency conversion in the transmitting/receiving sections 203 are amplified in the amplifying sections 202, and transmitted from the transmitting/receiving antennas 201.

The transmitting/receiving sections 203 receive whether to employ the mode of semi-statically determining HARQ-ACK codebook or the mode of dynamically determining HARQ-ACK codebook, through higher layer signaling or the like. The transmitting/receiving sections 203 transmit HARQ-ACKs (HARQ-ACKs based on the codebook and HARQ-ACKs for which fallback PUCCH transmission is employed).

The transmitting/receiving sections 203 receive information related to a PUCCH resource set corresponding to an HARQ-ACK(s) transmitted based on the HARQ-ACK codebook and a PUCCH resource set to be used for an HARQ-ACK transmission(s) of up to the certain number of bits. The transmitting/receiving sections 103 may receive information specifying a certain PUCCH resource among a plurality of PUCCH resource candidates included in a PUCCH resource set.

Figure 10:
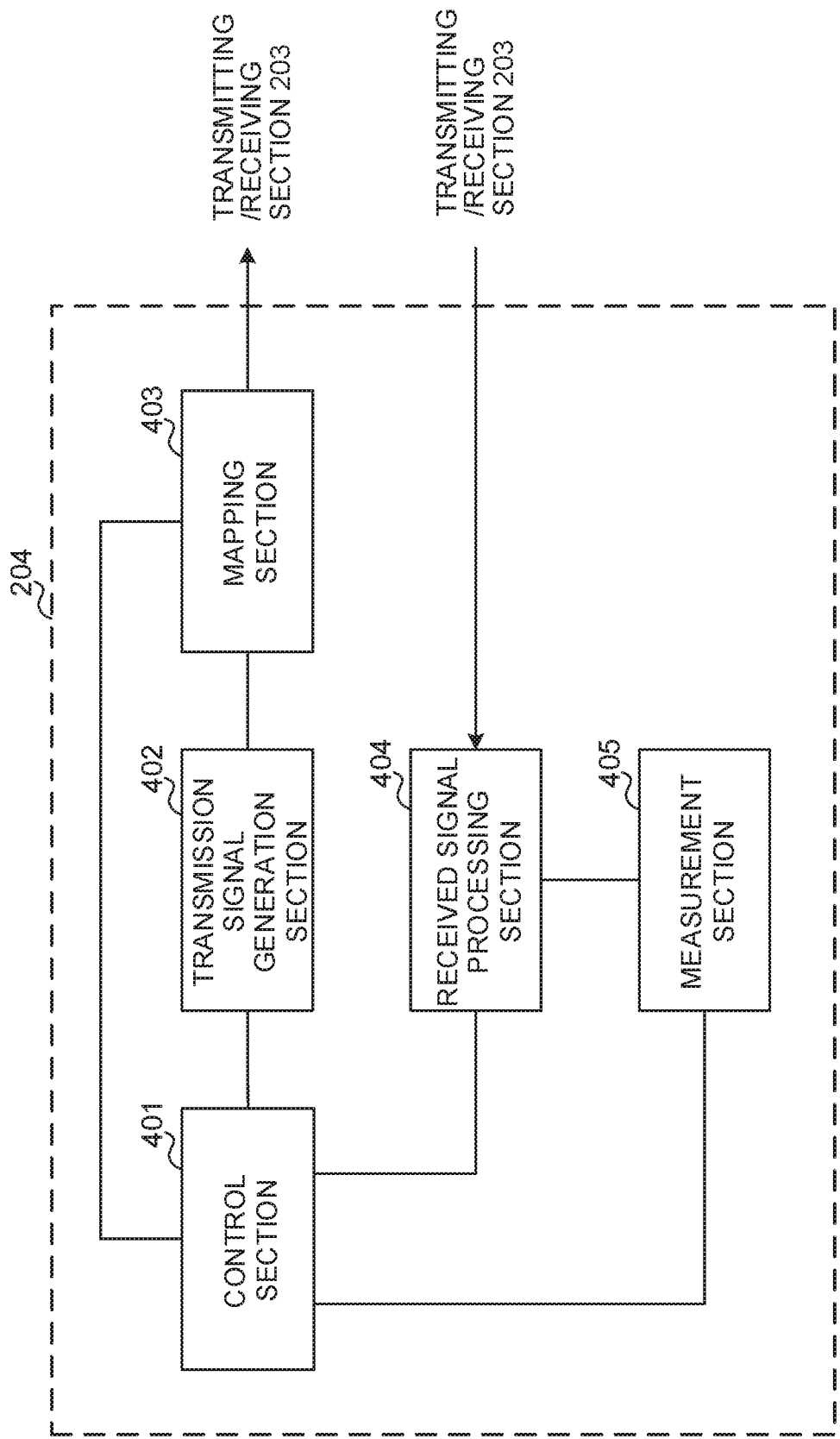
FIG. 10 is a diagram to show an example of a functional structure of the user terminal according to the present embodiment.

FIG. 10 is a diagram to show an example of a functional structure of the user terminal according to one embodiment of the present invention. Note that, although this example primarily shows functional blocks that pertain to characteristic parts of the present embodiment, the user terminal 20 includes other functional blocks that are necessary for radio communication as well.

The baseband signal processing section 204 included in the user terminal 20 includes at least a control section 401, a transmission signal generation section 402, a mapping section 403, a received signal processing section 404, and a measurement section 405. Note that these structures only need to be included in the user terminal 20, and a part or all of the structures may not be included in the baseband signal processing section 204.

The control section 401 controls the whole of the user terminal 20. The control section 401 can be constituted with a controller, a control circuit, or control apparatus that can be described based on general understanding of the technical field to which the present invention pertains.

The control section 401 controls, for example, signal generation of the transmission signal generation section 402, signal mapping of the mapping section 403, and so on. The control section 401 controls a signal receiving process of the received signal processing section 404, signal measurement of the measurement section 405, and so on.

The control section 401 acquires the downlink control signals and the downlink data signals transmitted from the radio base station 10, through the received signal processing section 404. The control section 401 controls generation of an uplink control signal and/or an uplink data signal, based on the results determining whether retransmission control for the downlink control signal and/or the downlink data signal is required or not, for example.

When the mode of determining codebook of a transmission acknowledgement signal(s), based on information reported through higher layer signaling, the control section 401 controls a transmission of the transmission acknowledgement signal(s) by using one of the first PUCCH resource set configured for transmission acknowledgement signals to be transmitted based on the codebook and the second PUCCH resource set configured for a transmission acknowledgement signal(s) of up to the certain number of bits, based on the number of bits of the transmission acknowledgement signal(s), or the number of bits of the transmission acknowledgement signal(s) and the type of cell in which the downlink transmission is to be performed.

For example, the control section 401 controls the transmission(s) of the transmission acknowledgement signal(s) by using, as the second PUCCH resource set, one of the PUCCH resource set configured through higher layer signaling in a UE-specific manner and the PUCCH resource set configured through higher layer signaling in a UE-common manner. The control section 401 may perform such control as to use the UE-common PUCCH resource set when no PUCCH resource set is configured in a UE-specific manner. The control section 401 may determine the UE-common PUCCH resource set configured in a UE-common manner, based on system information.

The control section 401 may perform such control as to transmit a transmission acknowledgement signal for downlink transmission by using the second PUCCH resource set, when a downlink signal is transmitted in a primary cell or a downlink signal is scheduled on a downlink control channel in a common search space.

The transmission signal generation section 402 generates uplink signals (uplink control signals, uplink data signals, uplink reference signals, and so on), based on commands from the control section 401, and outputs the generated uplink signals to the mapping section 403. The transmission signal generation section 402 can be constituted with a signal generator, a signal generation circuit, or signal generation apparatus that can be described based on general understanding of the technical field to which the present invention pertains.

The transmission signal generation section 402 generates, for example, uplink control signals related to delivery confirmation information, channel state information (CSI), and so on, based on commands from the control section 401. The transmission signal generation section 402 also generates uplink data signals, based on a command from the control section 401. For example, when downlink control signals notified from the radio base station 10 include a UL grant, the transmission signal generation section 402 is given a command to generate uplink data signals from the control section 401.

The mapping section 403 maps the uplink signals generated in the transmission signal generation section 402 to radio resources, based on commands from the control section 401, and outputs these to the transmitting/receiving sections 203. The mapping section 403 can be constituted with a mapper, a mapping circuit, or mapping apparatus that can be described based on general understanding of the technical field to which the present invention pertains.

The received signal processing section 404 performs a receiving process (for example, demapping, demodulation, decoding, and so on) on the received signals input from the transmitting/receiving sections 203. Here, the received signals are, for example, downlink signals (downlink control signals, downlink data signals, downlink reference signals, and so on) transmitted from the radio base station 10. The received signal processing section 404 can be constituted with a signal processor, a signal processing circuit, or signal processing apparatus that can be described based on general understanding of the technical field to which the present invention pertains. Also, the received signal processing section 404 can constitute a receiving section according to the present invention.

The received signal processing section 404 outputs information decoded through the receiving process to the control section 401. The received signal processing section 404 outputs, for example, broadcast information, system information, RRC signaling, DCI, and so on to the control section 401. The received signal processing section 404 outputs the received signals and/or the signals after the receiving process to the measurement section 405.

The measurement section 405 conducts measurements with respect to the received signals. The measurement section 405 can be constituted with a measurer, a measurement circuit, or measurement apparatus that can be described based on general understanding of the technical field to which the present invention pertains.

For example, the measurement section 405 may conduct RRM measurement, CSI measurement, and so on, based on the received signals. The measurement section 405 may conduct measurements with respect to received power (for example, RSRP), reception quality (for example, RSRQ and SINR), signal intensity (for example, RSSI), channel information (for example, CSI), and so on. The measurement results may be output to the control section 401.

<Hardware Structure>

Note that the block diagrams that have been used to describe the above embodiments show blocks in functional units. These functional blocks (components) may be implemented in arbitrary combinations of hardware and/or software. Also, the method for implementing each functional block is not particularly limited. That is, each functional block may be realized by one piece of apparatus that is physically and/or logically aggregated, or may be realized by directly and/or indirectly connecting two or more physically and/or logically separate pieces of apparatus (via wire and/or wireless, for example) and using these plurality of pieces of apparatus.

Figure 11:
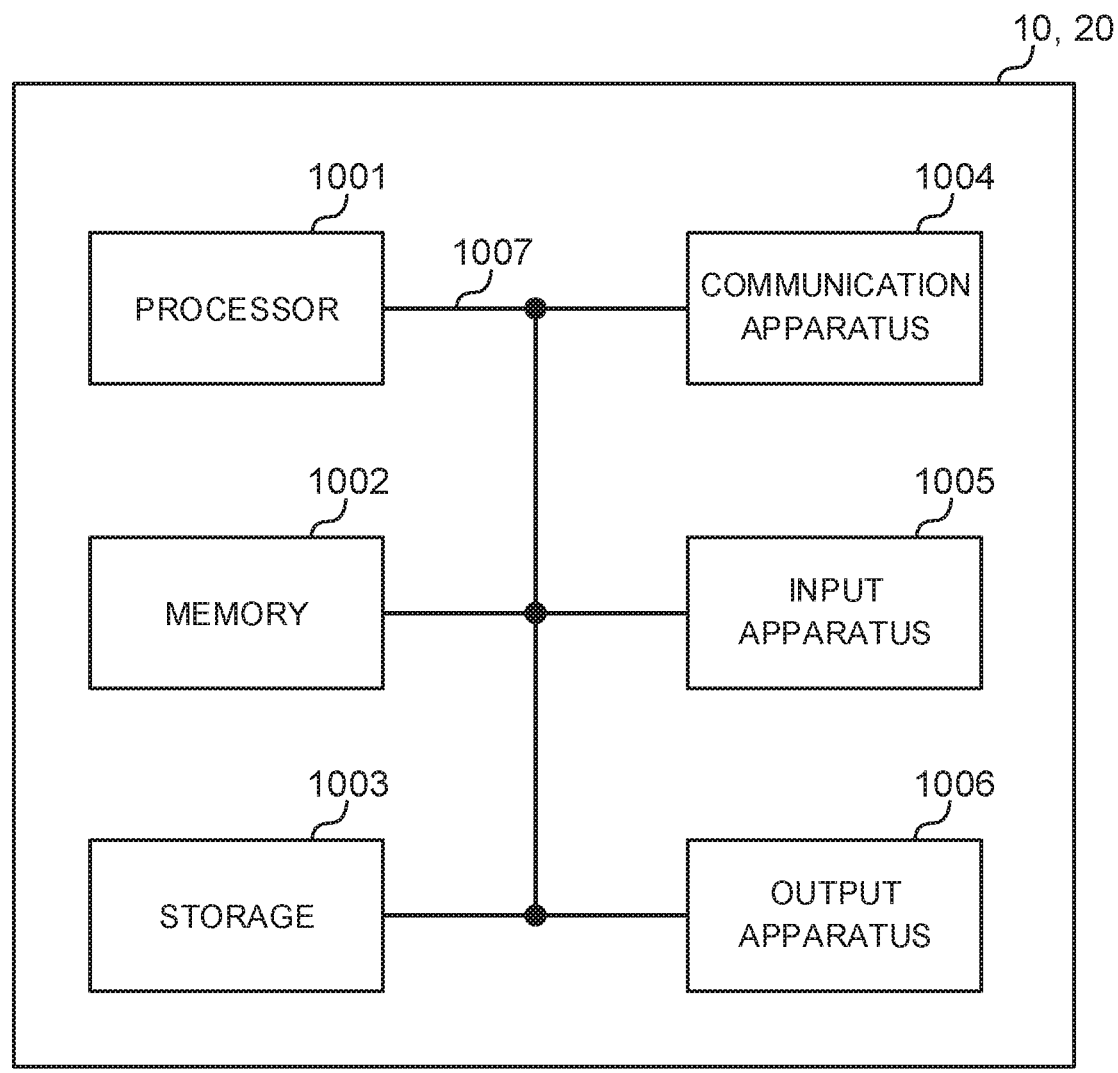
FIG. 11 is a diagram to show an example of a hardware structure of the radio base station and the user terminal according to the present embodiment.

For example, a radio base station, a user terminal, and so on according to one embodiment of the present invention may function as a computer that executes the processes of the radio communication method of the present invention. FIG. 11 is a diagram to show an example of a hardware structure of the radio base station and the user terminal according to one embodiment of the present invention. Physically, the above-described radio base station 10 and user terminals 20 may each be formed as computer apparatus that includes a processor 1001, a memory 1002, a storage 1003, a communication apparatus 1004, an input apparatus 1005, an output apparatus 1006, a bus 1007, and so on.

Note that, in the following description, the word "apparatus" may be interpreted as "circuit," "device," "unit," and so on. The hardware structure of the radio base station 10 and the user terminals 20 may be designed to include one or more of apparatuses shown in the drawings, or may be designed not to include part of apparatuses.

For example, although only one processor 1001 is shown, a plurality of processors may be provided. Furthermore, processes may be implemented with one processor or may be implemented at the same time, in sequence, or in different manners with one or more processors. Note that the processor 1001 may be implemented with one or more chips.

Each function of the radio base station 10 and the user terminals 20 is implemented, for example, by allowing certain software (programs) to be read on hardware such as the processor 1001 and the memory 1002, and by allowing the processor 1001 to perform calculations to control communication via the communication apparatus 1004 and read and/or write data in the memory 1002 and the storage 1003.

The processor 1001 controls the whole computer by, for example, running an operating system. The processor 1001 may be configured with a central processing unit (CPU), which includes interfaces with peripheral apparatus, control apparatus, computing apparatus, a register, and so on. For example, the above-described baseband signal processing section 104 (204), call processing section 105, and so on may be implemented by the processor 1001.

Furthermore, the processor 1001 reads programs (program codes), software modules, data, and so on from the storage 1003 and/or the communication apparatus 1004, into the memory 1002, and executes various processes according to these. As for the programs, programs to allow computers to execute at least part of the operations of the above-described embodiments are used. For example, the control section 401 of each user terminal 20 may be implemented by control programs that are stored in the memory 1002 and that operate on the processor 1001, and other functional blocks may be implemented likewise.

The memory 1002 is a computer-readable recording medium, and may be constituted with, for example, at least one of a ROM (Read Only Memory), an EPROM (Erasable Programmable ROM), an EEPROM (Electrically EPROM), a RAM (Random Access Memory), and other appropriate storage media. The memory 1002 may be referred to as a "register," a "cache," a "main memory (primary storage apparatus)," and so on. The memory 1002 can store executable programs (program codes), software modules, and/or the like for implementing a radio communication method according to one embodiment of the present invention.

The storage 1003 is a computer-readable recording medium, and may be constituted with, for example, at least one of a flexible disk, a floppy (registered trademark) disk, a magneto-optical disk (for example, a compact disc (CD-ROM (Compact Disc ROM) and so on), a digital versatile disc, a Blu-ray (registered trademark) disk), a removable disk, a hard disk drive, a smart card, a flash memory device (for example, a card, a stick, and a key drive), a magnetic stripe, a database, a server, and other appropriate storage media. The storage 1003 may be referred to as "secondary storage apparatus."

The communication apparatus 1004 is hardware (transmitting/receiving device) for allowing inter-computer communication via wired and/or wireless networks, and may be referred to as, for example, a "network device," a "network controller," a "network card," a "communication module," and so on. The communication apparatus 1004 may be configured to include a high frequency switch, a duplexer, a filter, a frequency synthesizer, and so on in order to realize, for example, frequency division duplex (FDD) and/or time division duplex (TDD). For example, the above-described transmitting/receiving antennas 101 (201), amplifying sections 102 (202), transmitting/receiving sections 103 (203), communication path interface 106, and so on may be implemented by the communication apparatus 1004.

The input apparatus 1005 is an input device that receives input from the outside (for example, a keyboard, a mouse, a microphone, a switch, a button, a sensor, and so on). The output apparatus 1006 is an output device that allows sending output to the outside (for example, a display, a speaker, an LED (Light Emitting Diode) lamp, and so on). Note that the input apparatus 1005 and the output apparatus 1006 may be provided in an integrated structure (for example, a touch panel).

Furthermore, these types of apparatus, including the processor 1001, the memory 1002, and others, are connected by a bus 1007 for communicating information. The bus 1007 may be formed with a single bus, or may be formed with buses that vary between pieces of apparatus.

Also, the radio base station 10 and the user terminals 20 may be structured to include hardware such as a microprocessor, a digital signal processor (DSP), an ASIC (Application-Specific Integrated Circuit), a PLD (Programmable Logic Device), an FPGA (Field Programmable Gate Array), and so on, and part or all of the functional blocks may be implemented by the hardware. For example, the processor 1001 may be implemented with at least one of these pieces of hardware.

(Variations)

Note that the terminology used in this specification and/or the terminology that is needed to understand this specification may be replaced by other terms that convey the same or similar meanings. For example, "channels" and/or "symbols" may be replaced by "signals" ("signaling"). Also, "signals" may be "messages." A reference signal may be abbreviated as an "RS," and may be referred to as a "pilot," a "pilot signal", and so on, depending on which standard applies. Furthermore, a "component carrier (CC)" may be referred to as a "cell," a "frequency carrier," a "carrier frequency," and so on.

Furthermore, a radio frame may be constituted of one or a plurality of periods (frames) in the time domain. Each of one or a plurality of periods (frames) constituting a radio frame may be referred to as a "subframe." Furthermore, a subframe may be constituted of one or a plurality of slots in the time domain. A subframe may have a fixed time length (for example, 1 ms) independent of numerology.

Furthermore, a slot may be constituted of one or a plurality of symbols in the time domain (OFDM (Orthogonal Frequency Division Multiplexing) symbols, SC-FDMA (Single Carrier Frequency Division Multiple Access) symbols, and so on). Furthermore, a slot may be a time unit based on numerology. A slot may include a plurality of mini-slots. Each mini-slot may be constituted of one or a plurality of symbols in the time domain. A mini-slot may be referred to as a "sub-slot."

A radio frame, a subframe, a slot, a mini-slot, and a symbol all express time units in signal communication. A radio frame, a subframe, a slot, a mini-slot, and a symbol may each be called by other applicable terms. For example, one subframe may be referred to as a "transmission time interval (TTI)," a plurality of consecutive subframes may be referred to as a "TTI," or one slot or one mini-slot may be referred to as a "TTI." That is, a subframe and/or a TTI may be a subframe (1 ms) in existing LTE, may be a shorter period than 1 ms (for example, 1 to 13 symbols), or may be a longer period than 1 ms. Note that a unit expressing TTI may be referred to as a "slot," a "mini-slot," and so on instead of a "subframe."

Here, a TTI refers to the minimum time unit of scheduling in radio communication, for example. For example, in LTE systems, a radio base station schedules the allocation of radio resources (such as a frequency bandwidth and transmission power that are available for each user terminal) for the user terminal in TTI units. Note that the definition of TTIs is not limited to this.

TTIs may be transmission time units for channel-encoded data packets (transport blocks), code blocks, and/or codewords, or may be the unit of processing in scheduling, link adaptation, and so on. Note that, when TTIs are given, the time interval (for example, the number of symbols) to which transport blocks, code blocks and/or codewords are actually mapped may be shorter than the TTIs.

Note that, in the case where one slot or one mini-slot is referred to as a TTI, one or more TTIs (that is, one or more slots or one or more mini-slots) may be the minimum time unit of scheduling. Furthermore, the number of slots (the number of mini-slots) constituting the minimum time unit of the scheduling may be controlled.

A TTI having a time length of 1 ms may be referred to as a "normal TTI" (TTI in LTE Rel. 8 to Rel. 12), a "long TTI," a "normal subframe," a "long subframe," and so on. A TTI that is shorter than a normal TTI may be referred to as a "shortened TTI," a "short TTI," a "partial or fractional TTI," a "shortened subframe," a "short subframe," a "mini-slot," a "sub-slot," and so on.

Note that a long TTI (for example, a normal TTI, a subframe, and so on) may be interpreted as a TTI having a time length exceeding 1 ms, and a short TTI (for example, a shortened TTI and so on) may be interpreted as a TTI having a TTI length shorter than the TTI length of a long TTI and equal to or longer than 1 MS.

A resource block (RB) is the unit of resource allocation in the time domain and the frequency domain, and may include one or a plurality of consecutive subcarriers in the frequency domain. Also, an RB may include one or a plurality of symbols in the time domain, and may be one slot, one mini-slot, one subframe, or one TTI in length. One TTI and one subframe each may be constituted of one or a plurality of resource blocks. Note that one or a plurality of RBs may be referred to as a "physical resource block (PRB (Physical RB))," a "sub-carrier group (SCG)," a "resource element group (REG)," a "PRB pair," an "RB pair," and so on.

Furthermore, a resource block may be constituted of one or a plurality of resource elements (REs). For example, one RE may correspond to a radio resource field of one subcarrier and one symbol.

Note that the above-described structures of radio frames, subframes, slots, mini-slots, symbols, and so on are merely examples. For example, structures such as the number of subframes included in a radio frame, the number of slots per subframe or radio frame, the number of mini-slots included in a slot, the numbers of symbols and RBs included in a slot or a mini-slot, the number of subcarriers included in an RB, the number of symbols in a TTI, the symbol length, the cyclic prefix (CP) length, and so on can be variously changed.

Also, the information, parameters, and so on described in this specification may be represented in absolute values or in relative values with respect to certain values, or may be represented in another corresponding information. For example, radio resources may be specified by certain indexes.

The names used for parameters and so on in this specification are in no respect limiting. For example, since various channels (PUCCH (Physical Uplink Control Channel), PDCCH (Physical Downlink Control Channel), and so on) and information elements can be identified by any suitable names, the various names assigned to these individual channels and information elements are in no respect limiting.

The information, signals, and/or others described in this specification may be represented by using any of a variety of different technologies. For example, data, instructions, commands, information, signals, bits, symbols, chips, and so on, all of which may be referenced throughout the herein-contained description, may be represented by voltages, currents, electromagnetic waves, magnetic fields or particles, optical fields or photons, or any combination of these.

Also, information, signals, and so on can be output from higher layers to lower layers and/or from lower layers to higher layers. Information, signals, and so on may be input and/or output via a plurality of network nodes.

The information, signals, and so on that are input and/or output may be stored in a specific location (for example, a memory) or may be managed by using a management table. The information, signals, and so on to be input and/or output can be overwritten, updated, or appended. The information, signals, and so on that are output may be deleted. The information, signals, and so on that are input may be transmitted to another apparatus.

Reporting of information is by no means limited to the aspects/embodiments described in this specification, and other methods may be used as well. For example, reporting of information may be implemented by using physical layer signaling (for example, downlink control information (DCI), uplink control information (UCI), higher layer signaling (for example, RRC (Radio Resource Control) signaling, broadcast information (master information block (MIB), system information blocks (SIBs), and so on), MAC (Medium Access Control) signaling), and other signals and/or combinations of these.

Note that physical layer signaling may be referred to as "L1/L2 (Layer 1/Layer 2) control information (L1/L2 control signals)," "L1 control information (L1 control signal)," and so on. Also, RRC signaling may be referred to as an "RRC message," and can be, for example, an RRC connection setup (RRCConnectionSetup) message, an RRC connection reconfiguration (RRCConnectionReconfiguration) message, and so on. Also, MAC signaling may be reported using, for example, MAC control elements (MAC CEs).

Also, reporting of certain information (for example, reporting of "X holds") does not necessarily have to be reported explicitly, and can be reported implicitly (by, for example, not reporting this certain information or reporting another piece of information).

Determinations may be made in values represented by one bit (0 or 1), may be made in Boolean values that represent true or false, or may be made by comparing numerical values (for example, comparison against a certain value).

Software, whether referred to as "software," "firmware," "middleware," "microcode," or "hardware description language," or called by other names, should be interpreted broadly to mean instructions, instruction sets, code, code segments, program codes, programs, subprograms, software modules, applications, software applications, software packages, routines, subroutines, objects, executable files, execution threads, procedures, functions, and so on.

Also, software, commands, information, and so on may be transmitted and received via communication media. For example, when software is transmitted from a website, a server, or other remote sources by using wired technologies (coaxial cables, optical fiber cables, twisted-pair cables, digital subscriber lines (DSL), and so on) and/or wireless technologies (infrared radiation, microwaves, and so on), these wired technologies and/or wireless technologies are also included in the definition of communication media.

The terms "system" and "network" as used herein are used interchangeably.

In the present specification, the terms "base station (BS)," "radio base station," "eNB," "gNB," "cell," "sector," "cell group," "carrier," and "component carrier" may be used interchangeably. A base station may be referred to as a "fixed station," "NodeB," "eNodeB (eNB)," "access point," "transmission point," "receiving point," "femto cell," "small cell," and so on.

A base station can accommodate one or a plurality of (for example, three) cells (also referred to as "sectors"). When a base station accommodates a plurality of cells, the entire coverage area of the base station can be partitioned into a plurality of smaller areas, and each smaller area can provide communication services through base station subsystems (for example, indoor small base stations (RRHs (Remote Radio Heads))). The term "cell" or "sector" refers to part of or the entire coverage area of a base station and/or a base station subsystem that provides communication services within this coverage.

In the present specification, the terms "mobile station (MS)," "user terminal," "user equipment (UE)," and "terminal" may be used interchangeably. A base station may be referred to as a "fixed station," "NodeB," "eNodeB (eNB)," "access point," "transmission point," "receiving point," "femto cell," "small cell," and so on.

Depending on a person skilled in the art, a mobile station may be referred to as a "subscriber station," "mobile unit," "subscriber unit," "wireless unit," "remote unit," "mobile device," "wireless device," "wireless communication device," "remote device," "mobile subscriber station," "access terminal," "mobile terminal," "wireless terminal," "remote terminal," "handset," "user agent," "mobile client," "client," or some other appropriate terms in some cases.

Furthermore, the radio base stations in this specification may be interpreted as user terminals. For example, each aspect/embodiment of the present invention may be applied to a configuration in which communication between a radio base station and a user terminal is replaced with communication among a plurality of user terminals (D2D (Device-to-Device)). In this case, the user terminals 20 may have the functions of the radio base stations 10 described above. In addition, wording such as "uplink" and "downlink" may be interpreted as "side." For example, an uplink channel may be interpreted as a side channel.

Likewise, the user terminals in this specification may be interpreted as radio base stations. In this case, the radio base stations 10 may have the functions of the user terminals 20 described above.

Actions which have been described in this specification to be performed by a base station may, in some cases, be performed by upper nodes. In a network including one or a plurality of network nodes with base stations, it is clear that various operations that are performed to communicate with terminals can be performed by base stations, one or more network nodes (for example, MMEs (Mobility Management Entities), S-GW (Serving-Gateways), and so on may be possible, but these are not limiting) other than base stations, or combinations of these.

The aspects/embodiments illustrated in this specification may be used individually or in combinations, which may be switched depending on the mode of implementation. The order of processes, sequences, flowcharts, and so on that have been used to describe the aspects/embodiments herein may be re-ordered as long as inconsistencies do not arise. For example, although various methods have been illustrated in this specification with various components of steps in exemplary orders, the specific orders that are illustrated herein are by no means limiting.

The aspects/embodiments illustrated in this specification may be applied to LTE (Long Term Evolution), LTE-A (LTE-Advanced), LTE-B (LTE-Beyond), SUPER 3G, IMT-Advanced, 4G (4th generation mobile communication system), 5G (5th generation mobile communication system), FRA (Future Radio Access), New-RAT (Radio Access Technology), NR (New Radio), NX (New radio access), FX (Future generation radio access), GSM (registered trademark) (Global System for Mobile communications), CDMA 2000, UMB (Ultra Mobile Broadband), IEEE 802.11 (Wi-Fi (registered trademark)), IEEE 802.16 (WiMAX (registered trademark)), IEEE 802.20, UWB (Ultra-WideBand), Bluetooth (registered trademark), systems that use other adequate radio communication methods and/or next-generation systems that are enhanced based on these.

The phrase "based on" (or "on the basis of") as used in this specification does not mean "based only on" (or "only on the basis of"), unless otherwise specified. In other words, the phrase "based on" (or "on the basis of") means both "based only on" and "based at least on" ("only on the basis of" and "at least on the basis of").

Reference to elements with designations such as "first," "second," and so on as used herein does not generally limit the quantity or order of these elements. These designations may be used herein only for convenience, as a method for distinguishing between two or more elements. Thus, reference to the first and second elements does not imply that only two elements may be employed, or that the first element must precede the second element in some way.

The term "judging (determining)" as used herein may encompass a wide variety of actions. For example, "judging (determining)" may be interpreted to mean making "judgments (determinations)" about calculating, computing, processing, deriving, investigating, looking up (for example, searching a table, a database, or some other data structures), ascertaining, and so on. Furthermore, "judging (determining)" may be interpreted to mean making "judgments (determinations)" about receiving (for example, receiving information), transmitting (for example, transmitting information), input, output, accessing (for example, accessing data in a memory), and so on. In addition, "judging (determining)" as used herein may be interpreted to mean making "judgments (determinations)" about resolving, selecting, choosing, establishing, comparing, and so on. In other words, "judging (determining)" may be interpreted to mean making "judgments (determinations)" about some action.

The terms "connected" and "coupled," or any variation of these terms as used herein mean all direct or indirect connections or coupling between two or more elements, and may include the presence of one or more intermediate elements between two elements that are "connected" or "coupled" to each other. The coupling or connection between the elements may be physical, logical, or a combination thereof. For example, "connection" may be interpreted as "access."

In this specification, when two elements are connected, the two elements may be considered "connected" or "coupled" to each other by using one or more electrical wires, cables and/or printed electrical connections, and, as some non-limiting and non-inclusive examples, by using electromagnetic energy having wavelengths in radio frequency regions, microwave regions, (both visible and invisible) optical regions, or the like.

In this specification, the phrase "A and B are different" may mean that "A and B are different from each other." The terms "separate," "be coupled," and so on may be interpreted similarly.

When terms such as "including," "comprising," and variations of these are used in this specification or in claims, these terms are intended to be inclusive, in a manner similar to the way the term "provide" is used. Furthermore, the term "or" as used in this specification or in claims is intended to be not an exclusive disjunction.

Now, although the present invention has been described in detail above, it should be obvious to a person skilled in the art that the present invention is by no means limited to the embodiments described herein. The present invention can be implemented with various corrections and in various modifications, without departing from the spirit and scope of the present invention defined by the recitations of claims. Consequently, the description herein is provided only for the purpose of explaining examples, and should by no means be construed to limit the present invention in any way.

What is claimed is:

1. A terminal comprising:
   a receiver that receives a downlink shared channel scheduled by downlink control information; and
   a processor that controls transmission of a transmission acknowledgement signal in response to the downlink shared channel reception,
   wherein, when the terminal is configured with a semi-statically determined codebook, the processor determines whether to use a first codebook or a second codebook as the codebook for the transmission acknowledgement signal, and
   wherein the first codebook is determined when a number of the downlink shared channel receptions in a time domain is greater than one, and the second codebook is determined when the number of the downlink shared channel receptions in the time domain is only one and the downlink shared channel is scheduled in a primary cell.

2. The terminal according to claim 1, wherein, when using the second codebook, the processor controls transmission of the transmission acknowledgement signal by using a given physical uplink control channel (PUCCH) resource set.

3. A radio communication method for a terminal, comprising:
   receiving a downlink shared channel scheduled by downlink control information;
   controlling transmission of a transmission acknowledgement signal in response to the downlink shared channel reception; and
   when the terminal is configured with a semi-statically determined codebook, determining whether to use a first codebook or a second codebook as the codebook for the transmission acknowledgement signal,
   wherein the first codebook is determined when a number of the downlink shared channel receptions in a time domain is greater than one, and the second codebook is determined when the number of the downlink shared channel receptions in the time domain is only one and the downlink shared channel is scheduled in a primary cell.

4. A base station in communication with a terminal, the base station comprising:
   a transmitter that transmits to the terminal a downlink shared channel scheduled by downlink control information; and
   a receiver that receives from the terminal a transmission acknowledgement signal in response to the downlink shared channel reception,
   wherein, when the terminal is configured with a semi-statically determined codebook, whether to use a first codebook or a second codebook as the codebook for the transmission acknowledgement signal is determined, and
   wherein the first codebook is determined when a number of the downlink shared channel receptions in a time domain is greater than one, and the second codebook is determined when the number of the downlink shared channel receptions in the time domain is only one and the downlink shared channel is scheduled in a primary cell.

5. A system comprising a terminal and a base station, wherein:
   the terminal comprises:
      a receiver that receives a downlink shared channel scheduled by downlink control information; and
      a processor that controls transmission of a transmission acknowledgement signal in response to the downlink shared channel reception,
      wherein, when the terminal is configured with a semi-statically determined codebook, the processor determines whether to use a first codebook or a second codebook as the codebook for the transmission acknowledgement signal, and wherein the first codebook is determined when a number of the downlink shared channel receptions in a time domain is greater than one, and the second codebook is determined when the number of the downlink shared channel receptions in the time domain is only one and the downlink shared channel is scheduled in a primary cell, and the base station comprises:
- a transmitter that transmits to the terminal the downlink shared channel; and
- a receiver that receives from the terminal the transmission acknowledgement signal.

* * * * *